US010652731B2

(12) United States Patent
Park et al.

(10) Patent No.: US 10,652,731 B2
(45) Date of Patent: *May 12, 2020

(54) METHOD AND SYSTEM FOR DOWNLOADING AND INSTALLING UICC TERMINAL PROFILE ON A TERMINAL FROM A PROFILE MANAGER

(71) Applicant: Samsung Electronics Co., Ltd., Suwon-si, Gyeonggi-do (KR)

(72) Inventors: Jonghan Park, Bucheon-si (KR); Duckey Lee, Seoul (KR); Sangsoo Lee, Yongin-si (KR); Taesun Yeom, Seoul (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,665

(22) Filed: Jul. 29, 2019

(65) Prior Publication Data

US 2019/0349751 A1 Nov. 14, 2019

Related U.S. Application Data

(63) Continuation of application No. 15/561,315, filed as application No. PCT/KR2016/003018 on Mar. 25, 2016, now Pat. No. 10,368,236.

(30) Foreign Application Priority Data

Mar. 25, 2015 (KR) ........................ 10-2015-0041479

(51) Int. Cl.
*H04W 8/24* (2009.01)
*H04W 8/18* (2009.01)
(Continued)

(52) U.S. Cl.
CPC ............. *H04W 8/245* (2013.01); *H04W 8/18* (2013.01); *H04W 8/20* (2013.01); *H04W 8/24* (2013.01);
(Continued)

(58) Field of Classification Search
CPC ........... H04W 8/18; H04W 8/24; H04W 4/02; H04W 48/02; H04W 48/04; H04W 48/08;
(Continued)

(56) References Cited

U.S. PATENT DOCUMENTS 9,037,193 B2 * 5/2015 Vergnes et al. ........ H04W 12/08
9,204,300 B2 * 12/2015 Park et al. ............ H04W 12/06
(Continued)

FOREIGN PATENT DOCUMENTS

WO 2012/076425 A1 6/2012
WO 2013/036010 A1 3/2013
WO 2014/092385 A1 6/2014

*Primary Examiner* — Meless N Zewdu
(74) *Attorney, Agent, or Firm* — Jefferson IP Law, LLP

(57) ABSTRACT

The present invention relates to a method to install a terminal profile in a wireless communication system, and the method may comprise the steps of: displaying a list including one or more mobile network providers; detecting a selection with respect to any one of the one or more mobile network providers; obtaining connection-related information with respect to the selected mobile network provider from a discovery server based on information related to the selected mobile network provider; and transmitting identification information of a universal integrated circuit card (UICC) and identification information of the discovery server to a server of the selected mobile network provider based on the connection-related information, in order to download a UICC-related profile from a profile administrator. However, the present invention is not limited to this embodiment and other embodiments are possible.

20 Claims, 17 Drawing Sheets

(51) Int. Cl.
*H04W 8/20* (2009.01)
*H04W 60/00* (2009.01)
*H04W 12/00* (2009.01)
*H04W 48/20* (2009.01)
*H04W 12/08* (2009.01)
*H04W 48/16* (2009.01)
*H04W 48/08* (2009.01)
*H04W 48/02* (2009.01)
*H04W 88/02* (2009.01)
*H04W 88/18* (2009.01)

(52) U.S. Cl.
CPC ..... *H04W 12/00514* (2019.01); *H04W 60/00* (2013.01); *H04W 8/183* (2013.01); *H04W 12/08* (2013.01); *H04W 48/02* (2013.01); *H04W 48/08* (2013.01); *H04W 48/16* (2013.01); *H04W 48/20* (2013.01); *H04W 88/02* (2013.01); *H04W 88/18* (2013.01)

(58) Field of Classification Search
CPC . H04W 12/1004; H04W 4/029; H04W 48/16; H04W 48/14; H04W 12/00; H04W 8/183; H04W 12/0605; H04W 12/06; H04W 12/08; H04W 12/245; H04W 60/00; H04W 8/20; H04W 88/18; H04W 48/18; H04W 8/205; H04W 76/02; H04W 92/08; H04W 4/00; H04W 12/0804; H04W 88/00; H04W 8/245; H04W 48/20; H04W 8/08; H04W 4/50; H04W 4/60; H04W 12/00514; H04W 8/186; H04W 12/00516; H04W 88/182; H04L 67/303; H04L 67/306; H04L 63/102; H04L 63/0853; H04L 29/06; H04B 1/3816; G06F 21/00; G06F 9/4451; G06F 16/335; G06F 16/337; G06F 16/9535; G06Q 30/0269
See application file for complete search history.

(56) References Cited

U.S. PATENT DOCUMENTS

| | | | |
|---|---|---|---|
| 9,301,145 B2 | 3/2016 | Merrien et al. | |
| 9,426,731 B1 | 8/2016 | Uy et al. | |
| 9,467,187 B2 | 10/2016 | Lee et al. | |
| 9,473,929 B2 | 10/2016 | Christopher et al. | |
| 9,832,634 B2* | 11/2017 | Cho et al. | H04W 8/183 |
| 10,075,205 B2* | 9/2018 | Lee et al. | H04B 1/3816 |
| 10,368,236 B2* | 7/2019 | Park et al. | H04W 8/245 |
| 2004/0236849 A1 | 11/2004 | Cooper et al. | |
| 2004/0260791 A1 | 12/2004 | Jerbi et al. | |
| 2009/0209232 A1* | 8/2009 | Cha et al. | 455/411 |
| 2012/0072979 A1 | 3/2012 | Cha et al. | |
| 2012/0190354 A1 | 7/2012 | Merrien et al. | |
| 2012/0260090 A1 | 10/2012 | Hauck et al. | |
| 2013/0324091 A1* | 12/2013 | Girard et al. | H04W 12/06 |
| 2013/0339305 A1 | 12/2013 | Kim et al. | |
| 2014/0179277 A1* | 6/2014 | Khan et al. | H04W 12/08 |
| 2014/0206313 A1 | 7/2014 | Spanel et al. | |
| 2014/0220952 A1 | 8/2014 | Holtmanns et al. | |
| 2014/0237101 A1 | 8/2014 | Park | |
| 2014/0329502 A1 | 11/2014 | Lee et al. | |
| 2015/0121495 A1 | 4/2015 | Gao et al. | |
| 2015/0134958 A1* | 5/2015 | Merrien et al. | H04L 63/123 |
| 2015/0349825 A1 | 12/2015 | Lee et al. | |
| 2016/0006728 A1* | 1/2016 | Park et al. | H04L 63/0853 |
| 2016/0157092 A1* | 6/2016 | Uy et al. | H04W 8/245 |
| 2016/0283216 A1 | 9/2016 | Gao | |
| 2016/0286380 A1 | 9/2016 | Long | |
| 2016/0352698 A1 | 12/2016 | Long | |
| 2017/0077975 A1 | 3/2017 | Wang et al. | |
| 2017/0188230 A1 | 6/2017 | Danree et al. | |

\* cited by examiner

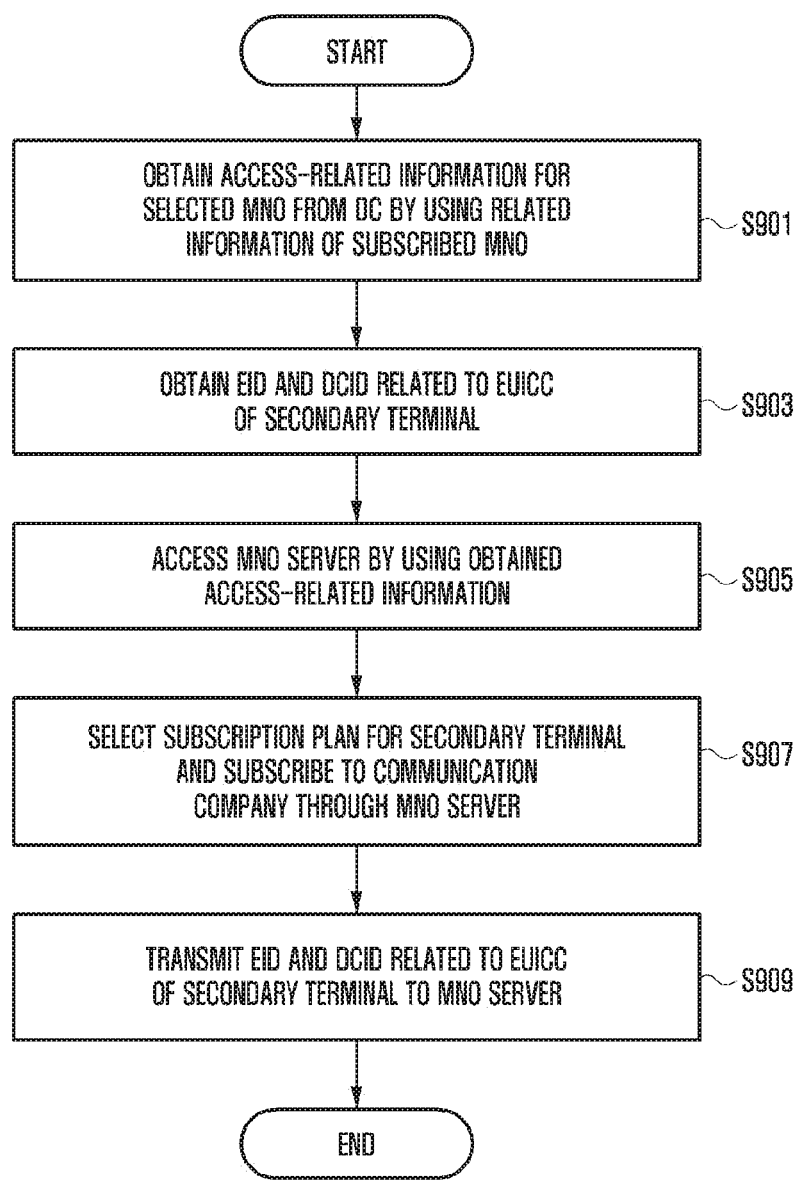

METHOD AND SYSTEM FOR DOWNLOADING AND INSTALLING UICC TERMINAL PROFILE ON A TERMINAL FROM A PROFILE MANAGER

CROSS-REFERENCE TO RELATED APPLICATION(S)

This application is a continuation application of prior application Ser. No. 15/561,315 filed on Sep. 25, 2017, which will issue as U.S. Pat. No. 10,368,236 on Jul. 30, 2019; which is a U.S. National Stage application under 35 U.S.C. § 371 of an International application number PCT/KR2016/003018 filed on Mar. 25, 2016, which is based on and claimed priority of a Korean patent application number 10-2015-0041479 filed on Mar. 25, 2015 in the Korean Intellectual Property Office, the disclosure of which is incorporated by reference herein in its entirety.

TECHNICAL FIELD

The invention relates to a method and apparatus for installing a profile for providing a communication service on a terminal in a wireless communication system. More particularly, the present invention relates to a method and apparatus for allowing a terminal to acquire information of a server for providing profile information, to receive the profile information from the server, and to provide a communication service.

BACKGROUND ART

A universal integrated circuit card (UICC), which is a smart card inserted into a mobile communication terminal, stores personal information such as network attachment authentication information, a phone book and SMS of a mobile communication subscriber, and performs subscriber authentication and traffic security key generation for the utilization of secure mobile communication upon attachment to a mobile communication network such as GSM, WCDMA, and LTE. The UICC is equipped with communication applications such as a subscriber identification module (SIM), a universal SIM (USIM), and an IP multimedia SIM (ISIM), depending on the type of a mobile communication network to which a subscriber accesses, and provides a high-level security function for mounting various applications such as electronic wallet, ticketing, electronic passport, and the like.

A conventional UICC is manufactured as a dedicated card for a specific mobile communication operator upon request, and is equipped in advance with authentication information (e.g., USIM application and subscriber identification ID (IMSI), an encryption key (K) value) for attachment to an operator's network. The manufactured UICC card is supplied to subscribers by a mobile communication operator, which may then, if necessary, perform management such as installation, modification, and deletion of applications in the UICC using techniques such as over the air (OTA). A subscriber may use a network and application services of a relevant mobile communication operator by inserting a UICC card into his or her mobile communication terminal. When exchanging a terminal for a new one, a subscriber may use, as they are, authentication information, mobile communication telephone numbers, a personal telephone directory, etc. stored in a UICC card by inserting the UICC card of the existing terminal into the new terminal.

Meanwhile, a UICC card maintains international compatibility by defining its physical shape and logical function in a standardization organization called European Telecommunications Standards Institute (ETSI). A form factor that defines a physical shape is getting smaller and smaller from the most widely used Mini SIM to Micro SIM that began to be used a few years ago, and recently to Nano SIM. This tendency greatly contributes to the miniaturization of a mobile communication terminal, but it is expected that a UICC card smaller in size than the recently established Nano SIM will not be standardized because of an increasing possibility of loss. Also, because a detachable UICC card requires a space for mounting an insertion slot in a terminal, it is expected that further miniaturization will be difficult.

In addition, a detachable UICC card is not suitable for machine-to-machine (M2M) devices that require attachment to a mobile communication data network without direct manipulation of a person in various installation environments such as intelligent home appliances, electricity/water meters, and CCTV cameras.

In order to solve such a problem, a method for replacing a conventional detachable UICC may be considered by embedding a security module for performing a function similar to UICC in a mobile communication terminal at the manufacture of the terminal. Such a security module may be installed in a terminal when the terminal is manufactured, and may be mounted so as not to be removable in a certain terminal. Therefore, it may be difficult for a terminal to previously equip network attachment authentication information, such as IMSI and K of USIM, for a specific mobile communication operator at the manufacture of the terminal unless the terminal is manufactured as a dedicated card for a specific mobile communication operator. Setting of this authentication information is possible only after a user who purchases the terminal joins a specific mobile communication operator.

Unlike a conventional UICC card which is manufactured and distributed for a specific mobile communication operator, a UICC including an eUICC which is a newly introduced terminal-embedded security module requires a solution of securely and flexibly installing and managing authentication information of various mobile communication operators when a user purchasing a terminal performs subscription to or unsubscription from a specific mobile communication operator or change of subscription to another operator.

DISCLOSURE OF INVENTION

Technical Problem

As described in the background art, various embodiments of the present invention are intended to provide a method and apparatus for remotely installing and managing, using technique such as wireless communication, profile information for a communication service on a terminal equipped with a UICC (including an eUICC and a detachable UICC) in a wireless communication network.

In addition, various embodiments of the present invention provide an apparatus and method for opening a UICC terminal through a terminal device of a mobile network operator at a mobile network operator's agency or the like. Also, various embodiments of the present invention provide an apparatus and method for subscribing to a communication service and opening a UICC terminal on-line at the terminal.

Solution to Problem

In a wireless communication system according to an embodiment of the present invention, a method for installing a profile at a terminal may comprise steps of displaying a list including at least one mobile network operator (MNO); detecting a selection of one of the at least one MNO; obtaining access-related information for the selected MNO from a discovery server, based on related information of the selected MNO; and transmitting identification information of a universal integrated circuit card (UICC) and identification information of the discovery server to a server of the selected MNO, based on the access-related information, in order to download a UICC-related profile from a profile manager.

In a wireless communication system according to an embodiment of the present invention, a method for installing a profile at a server may comprise steps of receiving related information of a mobile network operator (MNO) from a terminal; and transmitting access-related information for the MNO to the terminal, based on the received related information, wherein identification information of a universal integrated circuit card (UICC) and identification information of the server are delivered from the terminal to a server of the MNO, based on the access-related information, in order to download a UICC-related profile from a profile manager to the terminal.

In a wireless communication system according to an embodiment of the present invention, a method for installing a profile at a server may comprise steps of obtaining identification information of a universal integrated circuit card (UICC) and identification information of a discovery server; and delivering the identification information of the UICC and the identification information of the discovery server to a profile provider so that the profile provider generates a UICC-related profile.

A terminal in a wireless communication system according to an embodiment of the present invention may comprise a universal integrated circuit card (UICC); a communication unit configured to communicate with a discovery server, a server of a mobile network operator (MNO), and a profile manager; a display configured to display a screen; and a controller configured to control the display to display a list including at least one MNO, to detect a selection of one of the at least one MNO, to obtain access-related information for the selected MNO from the discovery server, based on related information of the selected MNO, and to transmit identification information of the UICC and identification information of the discovery server to a server of the selected MNO, based on the access-related information, in order to download a UICC-related profile from the profile manager.

A server in a wireless communication system according to an embodiment of the present invention may comprise a communication unit configured to communicate with a terminal and a profile manager of a mobile network operator (MNO); and a controller configured to control the communication unit to receive related information of the MNO from the terminal, and to transmit access-related information for the MNO to the terminal, based on the received related information, wherein identification information of a universal integrated circuit card (UICC) and identification information of the server are delivered from the terminal to a server of the MNO, based on the access-related information, in order to download a UICC-related profile from the profile manager to the terminal.

A server in a wireless communication system according to an embodiment of the present invention may comprise a communication unit configured to communicate with a terminal, a discovery server, and a profile provider; and a controller configured to obtain identification information of a universal integrated circuit card (UICC) and identification information of the discovery server, and to control the communication unit to deliver the identification information of the UICC and the identification information of the discovery server to the profile provider so that the profile provider generates a UICC-related profile.

Advantageous Effects of Invention

According to an embodiment of the present invention, it is possible to efficiently open and change a UICC terminal and also flexibly operate a profile management server for downloading a profile. Further, it is possible to remotely and flexibly install and manage a profile of a communication operator on a UICC terminal.

BRIEF DESCRIPTION OF DRAWINGS

FIG. 9A is a flow diagram illustrating operations of a primary terminal for installing a UICC-related profile of a secondary terminal in a wireless communication system according to still another embodiment of the present invention.

MODE FOR THE INVENTION

Figure 1:
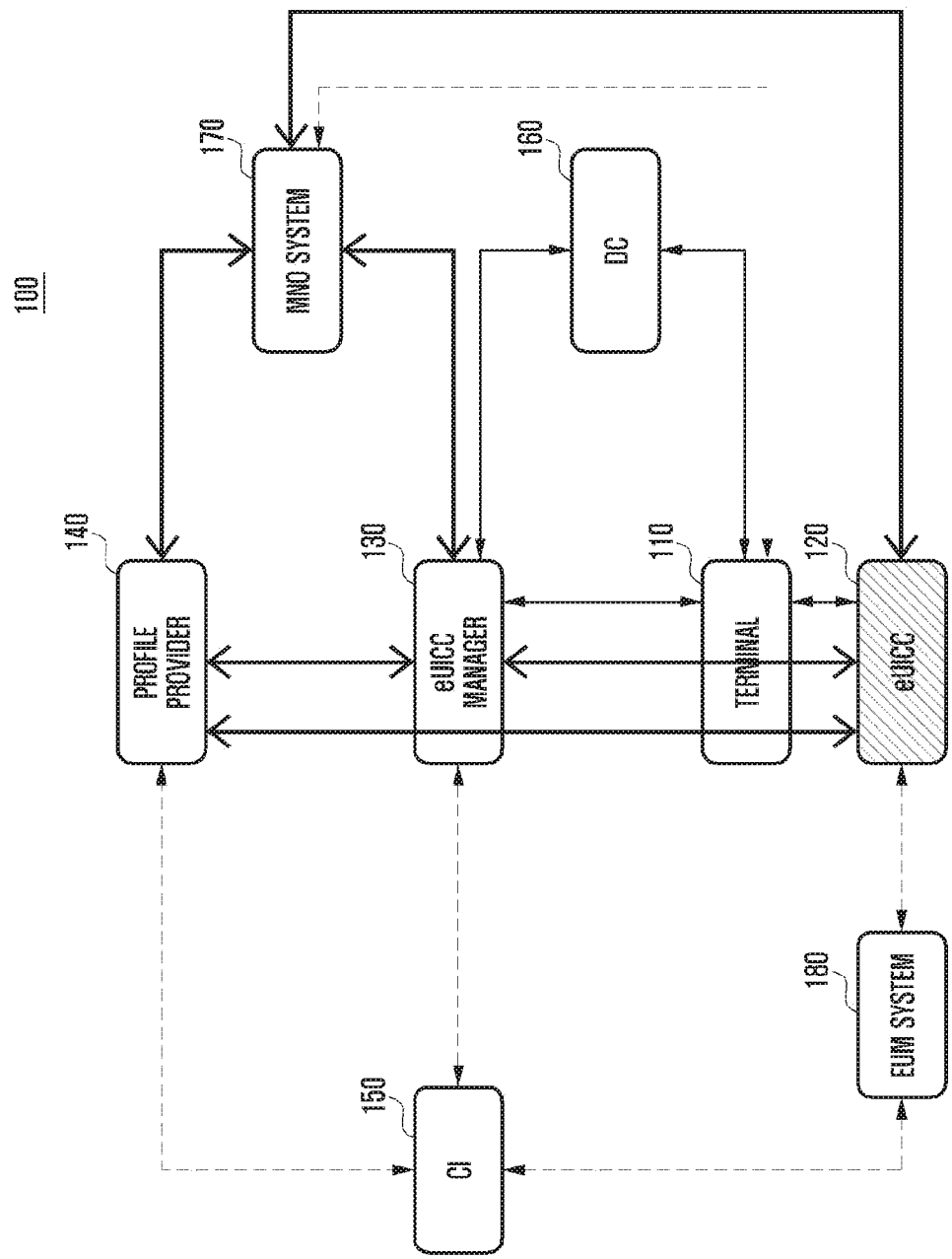
FIG. 1 is a block diagram schematically illustrating the configuration of a wireless communication system according to an embodiment of the present invention.

Hereinafter, embodiments of the present invention will be described with reference to the accompanying drawings.

In the following description of embodiments, descriptions of techniques that are well known in the art and not directly related to the present invention are omitted. This is to clearly convey the gist of the present invention by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the present invention and the manner of achieving them will become apparent with reference to embodiments described in detail below with reference to the accompanying drawings. The present invention may, however, be embodied in many different forms and should not be construed as limited to embodiments set forth herein. Rather, these embodiments are provided so that this disclosure will be thorough and complete, and will fully convey the scope of the invention to those skilled in the art. To fully disclose the scope of the invention to those skilled in the art, and the invention is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

In the following description of the present invention, a detailed description of known functions and configurations incorporated herein will be omitted when it may make the subject matter of the present invention rather unclear. Hereinafter, embodiments of the present invention will be described in detail with reference to the accompanying drawings.

First, terms used in this disclosure will be described. The terms used in embodiments of this disclosure may be defined as meanings understood by those skilled in the art, but, in case of matters related to embodiments disclosed herein, their operations or properties may be described in accordance with terms used herein.

In this disclosure, a UICC may include any functional equivalent similar to an eUICC capable of downloading and installing a profile, and also include any physical equivalent embedded or detachably mounted in a terminal.

For example, a UICC is a smart card inserted into a mobile communication terminal and may refer to a chip that stores personal information such as network attachment authentication information, a phone book and SMS of a mobile communication subscriber, and performs subscriber authentication and traffic security key generation for the utilization of secure mobile communication upon attachment to a mobile communication network such as GSM, WCDMA, and LTE. The UICC is equipped with communication applications such as a subscriber identification module (SIM), a universal SIM (USIM), and an IP multimedia SIM (ISIM), depending on the type of a mobile communication network to which a subscriber accesses, and may provide a high-level security function for mounting various applications such as electronic wallet, ticketing, electronic passport, and the like.

For example, although an embedded UICC (eUICC) which is an example of a UICC is assumed as a chip-type security module that is embedded in a terminal and may not be detachable, embodiments of this disclosure may be applied equally to any UICC that is manufactured in the form of typical detachable UICC and has the same electrical and software characteristics as the eUICC.

A UICC according to embodiments of the present invention may download and install a profile by using a general IP network such as a wireless communication network or WiFi. Various embodiments of this invention may be applied regardless of the type of network through which the profile is downloaded.

In this disclosure, a profile may refer to a software-form package of at least one of an application, a file system, and an authentication key value stored in a UICC.

In this disclosure, a USIM profile may have the same meaning as a profile or may refer to a software-form package of information contained in a USIM application within a profile.

In this disclosure, a profile provider may be also referred to as a subscription manager data preparation (SM-DP), a profile providing server, an off-card entity of profile domain, a profile encryption server, a profile provisioner, or the like.

In this disclosure, an eUICC manager may be also referred to as a subscription manager secure routing (SM-SR), a profile management server, an off-card entity of eUICC profile manager, or a profile manager.

In this disclosure, a discovery center may be also referred to as a discovery & push function (DPF), an address resolution server (ARS), a discovery server, a discovery function, or an event delivery function.

The term 'terminal' used herein may be also referred to as a mobile station (MS), a user equipment (UE), a user terminal (UT), a wireless terminal, an access terminal (AT), a user device, a subscriber unit, a subscriber station (SS), a wireless device, a wireless communication device, a wireless transmit/receive unit (WTRU), a mobile node, a mobile, or any other equivalent. In various embodiments, a terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a home appliance having a wireless communication function, a home appliance capable of wireless Internet access and browsing, and any portable unit or terminal that incorporates a combination of the above. Also, a terminal may be an instrument device having a communication function.

In this disclosure, a terminal may include, but not limited to, a machine-to-machine (M2M) terminal or a machine-type communication (MTC) terminal/device.

In this disclosure, a UICC terminal may refer to a terminal using a UICC.

In this disclosure, a profile qualifier may be expressed as a factor matched with profile identification information, a profile ID, an integrated circuit card ID (ICCID), or an issuer security domain-profile (ISD-P). For example, the profile ID may indicate a unique identifier of each profile. The profile qualifier may be used to identify a profile on a network.

In this disclosure, a UICC qualifier may be a unique identifier of a UICC for a terminal, and may be expressed as a UICC identifier or an eUICC ID (EID).

Hereinafter, for convenience of description, a UICC that downloads and installs a profile will be referred to as an eUICC.

FIG. 1 is a diagram illustrating exemplary configuration of a wireless communication system 100 for remotely transmitting and receiving a profile for providing a communication service according to an embodiment of the present invention.

Referring to FIG. 1, the wireless communication system 100 may include at least one of a terminal 110, an eUICC 120, an eUICC manager 130, a profile provider 140, a certificate issuer (CI) 150, a discovery center (DC) 160, a mobile network operator (MNO) system 170, and an eUICC manufacturer (EUM) system 180. The CI 150 may be also represented as a certificate authority (CA).

In the wireless communication system 100 according to an embodiment of the present invention, the terminal 110 for accessing (attaching) a wireless communication network may install a profile by transmitting and receiving a signal to and from the eUICC 120, select the installed profile, delete the installed profile, or initialize settings of the eUICC 120 and the profile.

The eUICC 120 may install a profile by transmitting and receiving a signal to and from the terminal 110, select the profile, delete the profile, or initialize settings of the eUICC 120 and the profile.

The eUICC 120 may store a CI public key or CI certificate and may also store an eUICC certificate and a private key. Using this, the eUICC 120 may authenticate a profile provider (e.g., 140) having a certificate and a private key which are issued by the same CI (e.g., 150) or its subsidiary CI (Sub CI).

The eUICC 120 may authenticate an eUICC manager (e.g., 130) having a certificate and a private key which are issued by a CI (e.g., 150) or its subsidiary CI corresponding to the stored CI public key.

The eUICC 120 may store a plurality of CI public keys or CI certificates and may use them for authentication.

The eUICC manager 130 may transmit and receive a signal to and from the DC 160 to deliver information necessary for initiation of a profile download.

The eUICC manager 130 may perform authority verification based on a certificate in managing the eUICC 120. In this case, the certificate of the eUICC manager 130 may represent a business entity such as a MNO or a terminal manufacturer. Based on the certificate of the eUICC manager 130, the eUICC 120 may verify an eUICC management operation performed by the eUICC manager 130.

In addition, the eUICC manager 130 may perform a profile management such as, for example, a profile download, a profile enablement and disablement, and a profile deletion.

The profile provider 140 may generate a profile package and perform encryption.

The DC 160 may help the eUICC 120 to find the eUICC manager 120 to be connected to process a pending eUICC management event. For example, a delivery of an eUICC management event to the eUICC 120 may be performed at the IP network in a push manner. Also, the terminal 110 may transmit and receive a signal to and from the DC 160 to transmit and receive information necessary for initiation of a profile download.

The MNO system 170 may include a terminal device in a communication agency, an MNO server, and an MNO business support system (MNO BSS). For example, the terminal device in the communication agency may acquire information related to an eUICC terminal (e.g., 110) when the subscription of the eUICC terminal is performed through the agency. The MNO server which may include an online portal server of MNO may allow the eUICC terminal (e.g., 110) to subscribe to a communication company through the online portal server and also acquire the eUICC terminal related information. The MNO BSS may deliver the acquired information related to the eUICC terminal to the profile provider 140.

In various embodiments of the present invention, the profile includes a subscriber identifier (e.g., international mobile subscriber identity (IMSI)) of the terminal and an encryption key (e.g., K) for authentication, and may also include various kinds of information for a communication service provided by the relevant communication operator.

Figure 2:
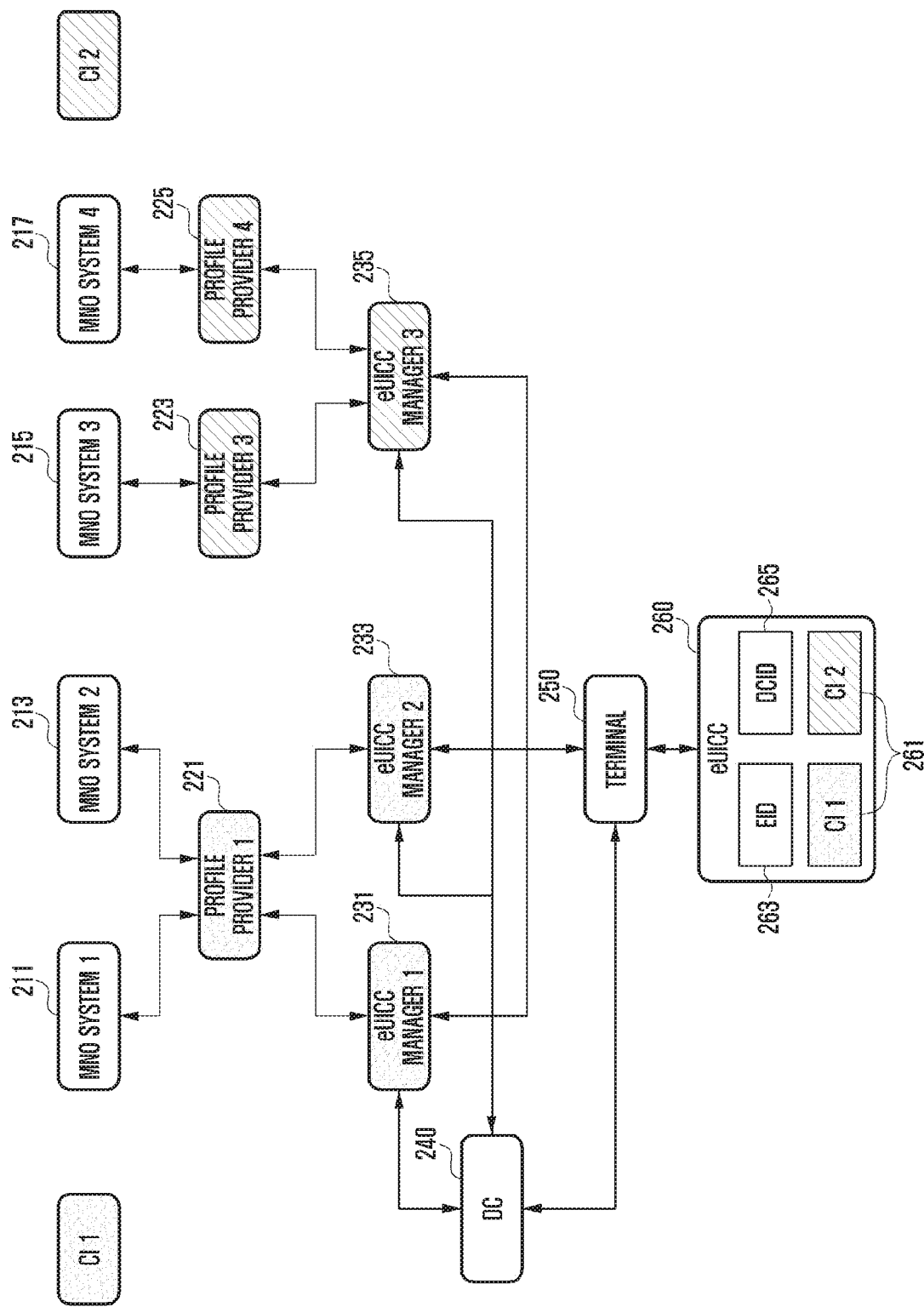
FIG. 2 is a block diagram schematically illustrating partial configuration of a wireless communication system according to an embodiment of the present invention.

FIG. 2 illustrates partial configuration of the wireless communication system 100 according to an embodiment of the present invention.

Referring to FIG. 2, a plurality of MNO systems may interwork with a profile provider individually. For example, each of profile providers 223 and 225 may interwork with an MNO BSS of one MNO system 215 or 217, and one profile provider 221 may interwork with MNO BSSs of a plurality of MNO systems 211 and 213.

In addition, an eUICC manager may interwork with a profile provider. For example, one eUICC manager 235 may interwork with a plurality of profile providers 223 and 225, and a plurality of eUICC managers 231 and 233 may interwork with one profile provider 221.

Also, one terminal 250 may interwork with one or more eUICC managers 231, 233 and 235. An eUICC 260 that stores a plurality of CI certificates or CI public keys 261 may authenticate an eUICC manager or profile provider issued by a relevant CI (e.g., CI 1 or CI 2) directly or through a subsidiary CI (Sub-CI). The eUICC 260 may store identification information, e.g., an EID 263, of eUICC. Also, the eUICC 260 may store identification information, e.g., a DCID 265, of a pre-designated DC (e.g., 240) for a profile download.

The DC 240 may interwork with one or more eUICC managers 231, 233 and 235 and provide a function of selecting an eUICC manager required for the terminal 250. At this time, necessary information stored in the DC 240 may be pushed to or pulled by the terminal 250.

Figure 3:
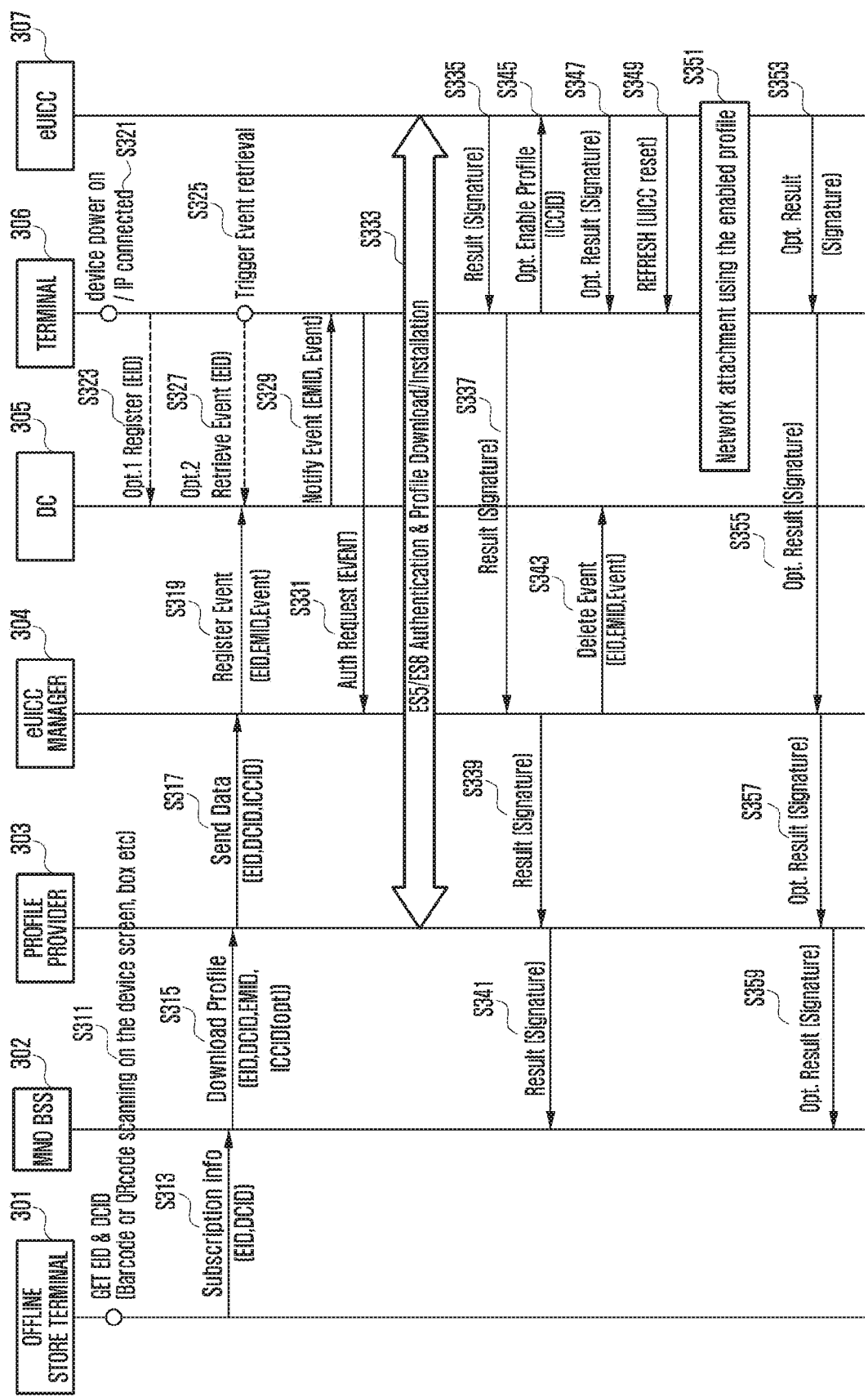
FIG. 3 is a flow diagram illustrating operations of installing a UICC-related profile in a wireless communication system according to one embodiment of the present invention.

FIG. 3 is a flow diagram illustrating operations of installing a UICC-related profile in a wireless communication system according to one embodiment of the present invention. This embodiment shows a method for installing a profile on a terminal equipped with eUICC, based on information acquired from the terminal through a terminal device equipped in a communication agency (i.e., an offline store) or operated by a communication company, when a user visits the agency and subscribes to a communication service.

Referring to FIG. 3, at step S311, a terminal device 301 in the offline store may read an EID and a DCID of a terminal 306 equipped with an eUICC 307. The EID may include identification information of the eUICC 307, and the DCID may include identification information of a DC 305 previously assigned to the terminal 306 or the eUICC 307. Such reading may use a barcode or a QR code. The barcode or the QR code may be output on a screen of the terminal 306 or printed on a packaging box of the terminal 306 or the like.

The DCID may have one of the following types.

1. Code type (e.g., 2 digits, 3 digits, 4 digits, 5 digits, other digits)

2. URI type

If the DCID is a code type, a value of the DCID may be recorded in a barcode form together with a value of the EID. This allows the operator to read the EID and DCID values by using the existing barcode reader.

If the DCID is a code type, the DCID value may be a part of the EID value.

If the DCID is a code type, an eUICC manager 304 needs to check mapping information between the DCID and an address of the DC 305 so as to deliver information to the DC 305 corresponding to the code value. The mapping information may be stored in an MNO BSS 302, a profile provider 303, or the eUICC manager 304.

When a subscription to a communication service is performed at the offline store with respect to the terminal 306, at step S313 a subscription information (Subscription Info) message that includes the obtained EID and DCID may be delivered from the terminal device 301 in the offline store 301 to the MNO BSS 302.

The subscription information message may also include an ICCID. The ICCID may include identification information of a profile to be downloaded to the eUICC 307. This case means that the offline store performs mapping between the EID and the ICCID. Alternatively, the MNO BSS 302 that receives the subscription information message may directly perform mapping between the available ICCID and the EID included in the subscription information message. Although not shown, the MNO BSS 302 may perform a subscription process based on the subscription information message. The subscription process may include a process of updating server information of the MNO so that the terminal 306 can access the mobile communication network of the communication company by using the profile after a profile download.

At step S315, the MNO BSS 302 may deliver a profile download (Download Profile) message to the profile provider 303. The profile download message may include the EID and the DCID, and may further include the ICCID. In addition, the profile download message may further include an EMID. The EMID may include identification information of the eUICC manager 304.

At step S317, the profile provider 303 may deliver a data transmission (Send Data) message to the eUICC manager 304, which corresponds to the received EMID or is preset in the profile provider 303, using the EID, the DCID the and ICCID included in the profile download message. The data transmission message may include the EID, the DCID, and the ICCID.

At step S319, the eUICC manager 304 may identify the DCID included in the data transmission message and deliver an event registration (Register Event) message to the DC 305. The event registration message may include the EID, the EMID, and event information. The event information may include an event ID and an event type. The event type may be used to distinguish events such as a policy rule download and a profile download.

Thereafter, at step S329, the DC 305 may deliver an event notification (Notify Event) message including the EMID and the event information to the terminal 306 by using one or both of the following two methods.

For example, if the terminal 306 is powered on and the IP is connected (Device power on/IP connected) at step S321, and then if the DC 305 registers the EID received from the terminal 306 through a registration (Register) message at step S323 (Opt. 1), the DC 305 may deliver the event notification message to the terminal 306.

Alternatively, if an event retrieval request (Trigger Event retrieval) occurs at the terminal at step S325, and if the DS 305 receives an event retrieval (Retrieve Event) message including the EID requesting an event notification from the terminal 306 at step S327 (Opt. 2), the DC 305 may deliver the event notification message to the terminal 306.

Thereafter, at step S331, the terminal 306 may transmit an authentication request message to the eUICC manager 304, based on the EMID included in the event notification message.

At step S333, the eUICC manager 304, the eUICC 307 and the profile provider 303 may perform mutual authentication, and the terminal 306 may download a profile from the eUICC manager 304 and install the profile in the eUICC 307.

For example, the eUICC manager 304 may perform mutual authentication with the eUICC 307, and if the mutual authentication is successful, the profile provider 303 may perform mutual authentication with the eUICC 307. At this time, the profile provider 303 may encrypt the profile by using a generated key and deliver the encrypted profile to the eUICC manager 304.

The eUICC manager 304 may add additional information for integrity protection to the encrypted profile information and deliver it to the terminal 306. Then, the terminal 306 may divide the received information and deliver it to the eUICC 307 to perform profile download and installation.

At step S335, the eUICC 307 may deliver a result message including a signature value of the eUICC to the terminal 306. At step S337, the terminal 306 may deliver the result message including the signature value to the eUICC manager 304. Also, the eUICC manager 304 may deliver the result message including the signature value to the profile provider 303 at step S339, and the profile provider 303 may deliver the result message including the signature value to the MNO BSS 302 at step S341. In the end, the result message may be delivered to the MNO BSS 302. Alternatively, the eUICC manager 304 may deliver the result message directly to the MNO BSS 302.

Meanwhile, if the eUICC manager 304 detects that the event is completely processed based on the received result message, the eUICC manager 304 may deliver an event deletion (Delete Event) message to the DC 305 at step S343, and the DC 305 may delete the registered event information, based on the received event deletion message.

Optionally, at step S345, the terminal 306 may deliver a profile enable (Enable Profile) message having the ICCID value as a factor to the eUICC 307 to enable the profile corresponding to the ICCID value. At step S347, the eUICC 307 may notify a response to the profile enable message to the terminal 307, and if there is any previously enabled profile, may disable the enabled profile and then enable a profile corresponding to the ICCID.

After the event operation is completed, the eUICC 307 may deliver a refresh message including UICC reset information to the terminal 306 at step S349.

At step S351, the terminal 306 may perform network attachment using the newly enabled profile.

Thereafter, optionally, the eUICC 307 may deliver a result message for the network attachment using the enabled profile including the signature value of the eUICC to the terminal 306 at step S353. At step S355, the terminal 306 may deliver the result message including the signature value to the eUICC manager 304. Also, the eUICC manager 304 may deliver the result message including the signature value to the profile provider 303 at step S357, and the profile provider 303 may deliver the result message including the signature value to the MNO BSS 302 at step S359. In the end, the result message may be delivered to the MNO BSS 302. Alternatively, the eUICC manager 304 may deliver the result message directly to the MNO BSS 302.

Figure 4:
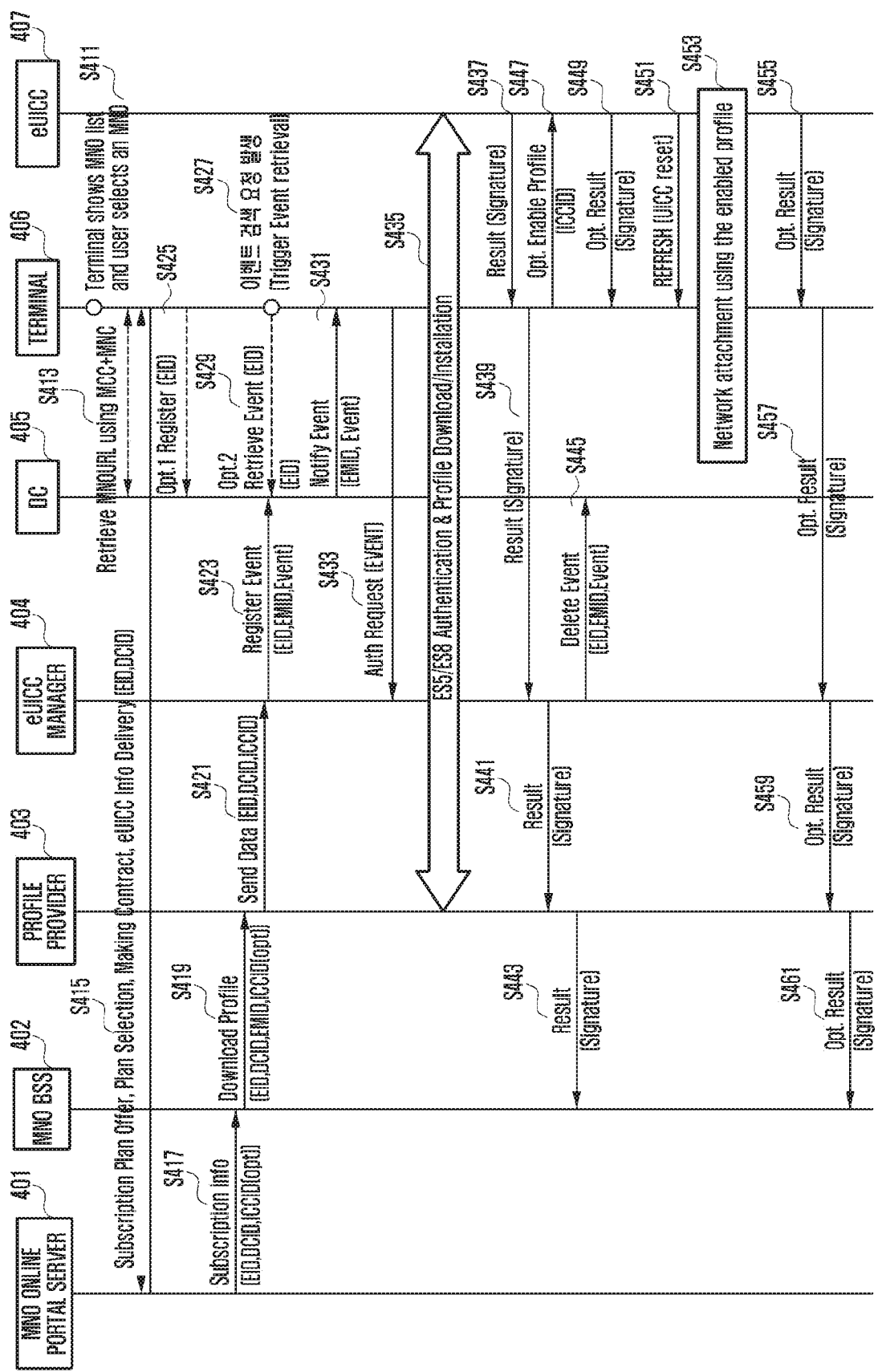
FIG. 4 is a flow diagram illustrating operations of installing a UICC-related profile in a wireless communication system according to another embodiment of the present invention.

FIG. 4 is a flow diagram illustrating operations of installing a UICC-related profile in a wireless communication system according to another embodiment of the present invention. This embodiment shows a method for installing a profile on a terminal 406, based on information acquired from the terminal online, when a user selects a subscription plan and subscribes to a communication company by using the terminal 406 through an MNO online portal provided by an MNO server 401.

At step S411, the terminal 406 may display a list of user's selectable MNOs, and may detect a selection of one of the MNOs contained in the MNO list. The MNO list may include, for example, at least one of an MNO's company name, an MCC, and an MNC. The MNO list may be displayed using at least one of the following methods.

To display a predetermined MNO list
To display an MNO list corresponding to a PLMN ID value through RF scanning
To display a list received from a predetermined server
To display based on location (provide an MNO list available for each location)
To display based on capability of the terminal (based on WCDMA, LTE frequency band)

At step S413, using information related to the selected MNO (e.g., MCC, MMC), the terminal 406 may receive access-related information about the selected MNO (e.g., an MNO online portal server address) from a DC 405. The access-related information about the MNO may be, for example, URL information about an MNO's server.

For example, a message used for requesting the access-related information about the MNO may be an MNO access-related information retrieval (Retrieve MNOURL) message. A factor used for the MNO access-related information retrieval may be MCC and MNC values or a PLMN ID.

At step S415, the terminal 406 may access the MNO server 401, for example, the MNO online portal, by using the acquired MNO access-related information. The MNO server, e.g., the MNO online portal server 401, may provide a subscription plan available for the terminal 406 through the online portal. The terminal 406 may detect the selection of the plan to be subscribed and deliver the selection result to the MNO online portal server 401. Therefore, a contract or subscription between the MNO and the user via the terminal 406 may be completed.

During the above process, the terminal 406 may deliver an eUICC-related information delivery (eEUICC Info Delivery) message to the MNO online portal server. The eUICC-related information delivery message may include an EID value and a DCID value.

At step S417, when a subscription to the communication service is made through the MNO online portal, the MNO online portal server 401 may deliver a subscription information (Subscription Info) message including the EID and the DCID to a profile provider 403 through an MNO BSS 402.

Steps S419 to S461 for downloading and installing the profile for the terminal 406 may be performed in the same manner as the above-described steps S315 to S359 in FIG. 3.

Figure 5:
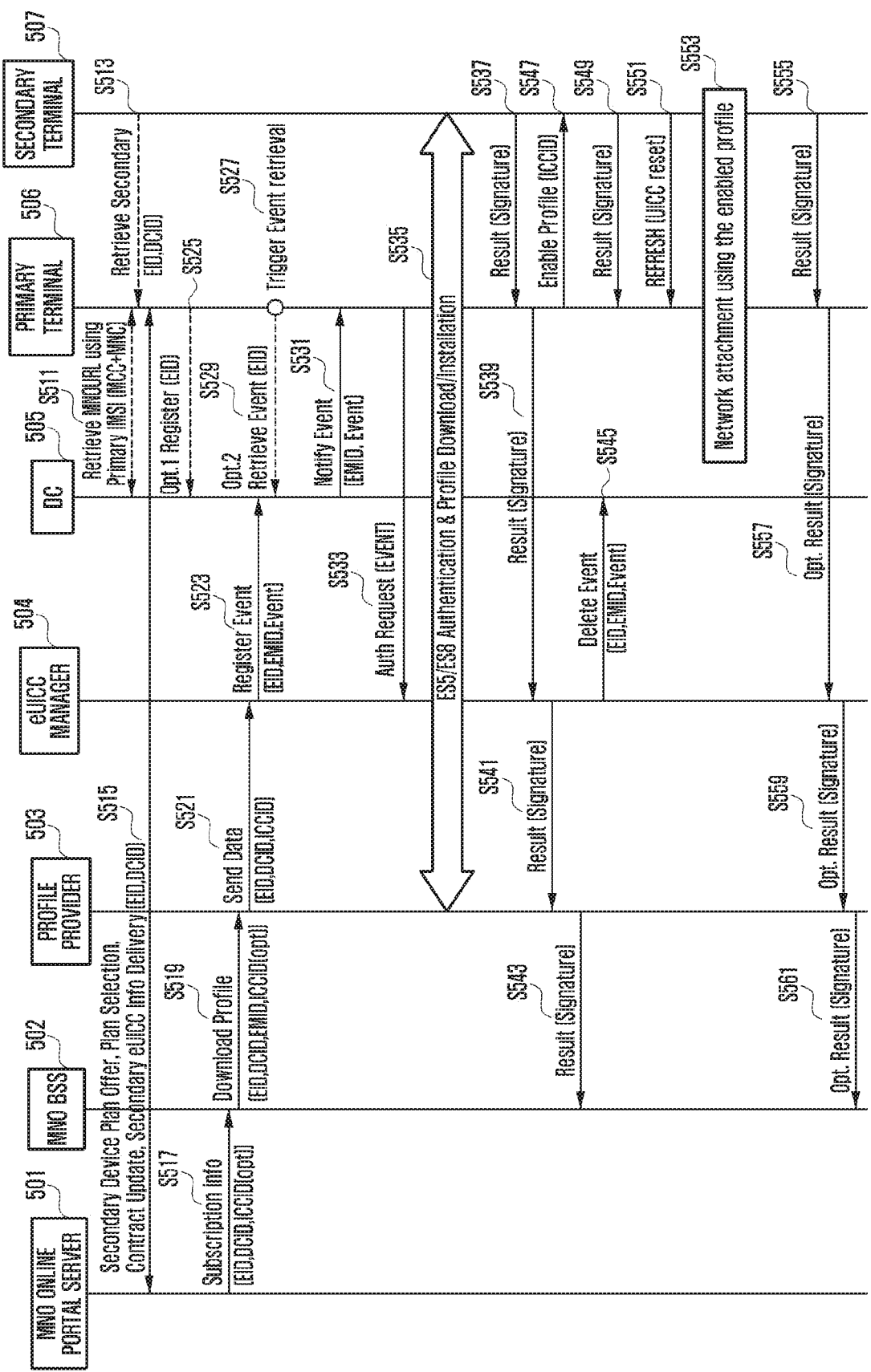
FIG. 5 is a flow diagram illustrating operations of installing a UICC-related profile of a secondary terminal in a wireless communication system according to still another embodiment of the present invention.

FIG. 5 is a flow diagram illustrating operations of installing a UICC-related profile of a secondary terminal 507 in a wireless communication system according to still another embodiment of the present invention. This embodiment shows a method for installing a profile on the secondary 507, based on information of the secondary terminal 507 acquired online a primary terminal 506, when a user subscribes to a communication company of the secondary terminal 507 by using the primary terminal 506 through an MNO online portal provided by an MNO server 501 to which the primary terminal subscribes.

Referring to FIG. 5, at step S511, using information (e.g., PLMN ID or MCC and MMC) related to the MNO to which the primary terminal subscribes, the primary terminal 506 may receive access-related information about the MNO (e.g., an MNO online portal server address) from a DC 505. The access-related information about the MNO may be, for example, URL information about an MNO's server. For example, a message used for requesting the access-related information about the MNO may be an MNO access-related information retrieval (Retrieve MNOURL) message. A factor used for the MNO access-related information retrieval may be MCC and MNC values or a PLMN ID.

At step S513, the primary terminal 506 may obtain the EID and the DCID associated with the eUICC of the secondary terminal from the secondary terminal 507 on which the eUICC is mounted. For example, the primary terminal 506 and the secondary terminal 507 may interwork with each other using a Bluetooth SIM Access Profile.

At step S515, the primary terminal 506 may access the MNO server 501, for example, the MNO online portal, by using the obtained MNO access-related information.

The MNO server, e.g., the MNO online portal server 501, may provide a subscription plan available for the secondary terminal 506 through the online portal. The primary terminal 506 may detect the selection of the plan to be subscribed for the secondary terminal 507 and deliver the selection result to the MNO online portal server 501. Therefore, a contract or subscription between the MNO and the secondary terminal 507 via the primary terminal 506 may be completed.

During the above process, the primary terminal 506 may deliver an eUICC-related information delivery (eEUICC Info Delivery) message to the MNO online portal server. The eUICC-related information delivery message may include the EID and DCID values related to the eUICC of the secondary terminal obtained from the secondary terminal 507.

At step S517, when a subscription of the secondary terminal 507 to the communication service is made through the MNO online portal, the MNO online portal server 501 may deliver a subscription information (Subscription Info) message including the obtained EID and DCID to a profile provider 503 through an MNO BSS 502.

Steps S519 to S561 for downloading and installing the profile for the secondary terminal 507 may be performed in a manner similar to the above-described steps S315 to S359 in FIG. 3. However, the FIG. 5 embodiment differs in that the eUICC of the secondary terminal 507 performs mutual authentication with an eUICC manager 504 and the profile provider 503 and installs the profile on the eUICC of the secondary terminal 507.

Figure 6:
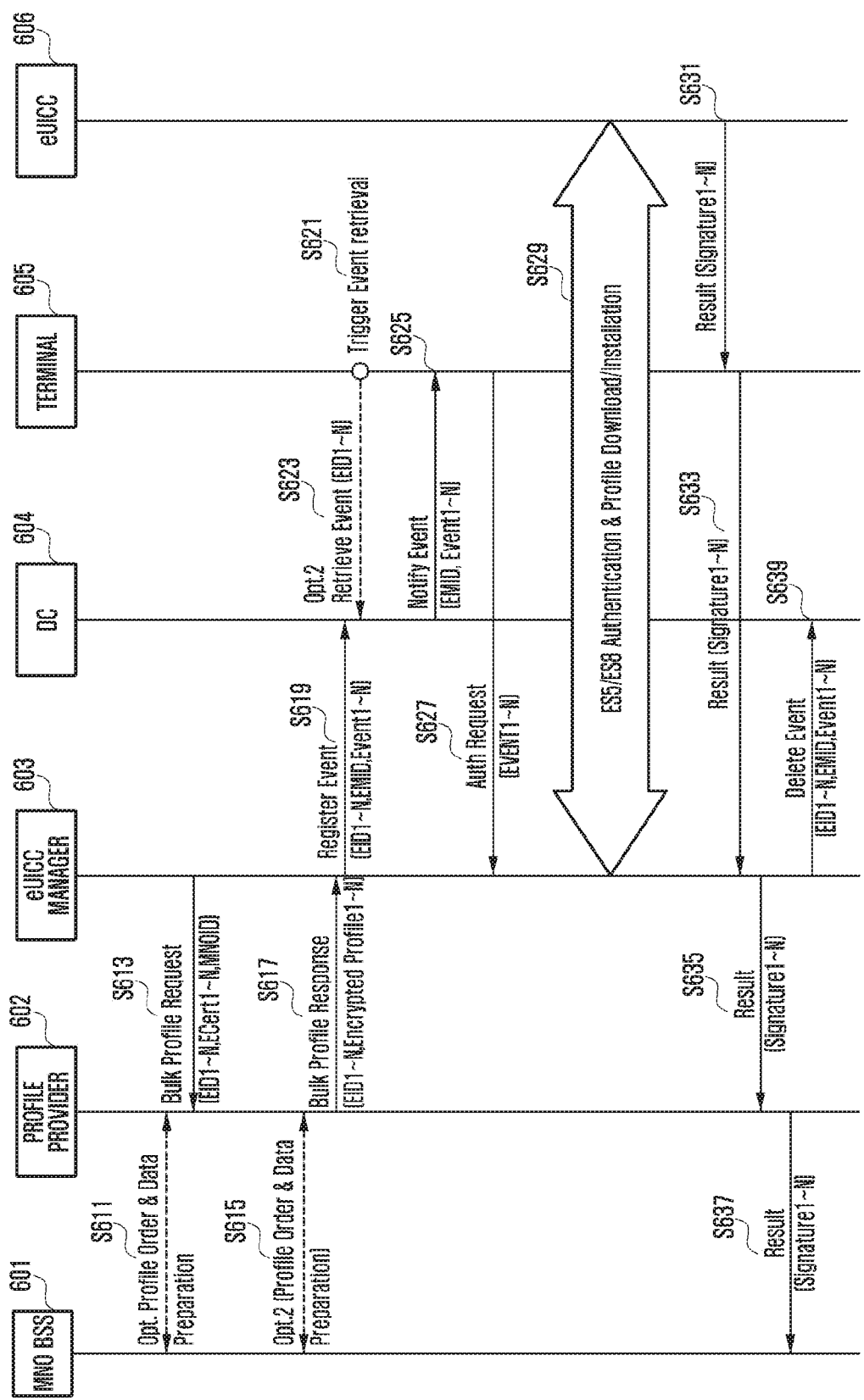
FIG. 6 is a flow diagram illustrating operations of collectively installing a UICC-related profile on a plurality of terminals in a wireless communication system according to yet another embodiment of the present invention.

FIG. 6 is a flow diagram illustrating operations of collectively installing a UICC-related profile on a plurality of terminals in a wireless communication system according to yet another embodiment of the present invention. This embodiment shows a process of effectively installing a profile on a plurality of terminals.

Referring to FIG. 6, at step S613, an eUICC manager 603 may deliver a bulk profile request message to a profile provider 602. The bulk profile request message may include N EIDs (EID1~N), N eUICC certificates (ECert1~N), and an MNO ID. The MNO ID may include identification information of the MNO.

Meanwhile, at step S611, the profile provider 602 may perform a profile generation (Profile Order & Data Preparation) in advance by interworking with an MNO BSS 601 (Opt A), or may perform a profile generation (Profile Order & Data Preparation) as much as necessary by interworking with the MNO BSS 601 at step S615 after receiving the bulk profile request message from the eUICC manager 603 (Opt B).

At step S617, the profile provider 602 may deliver a bulk profile response message including N EIDs (EID1~N) and encrypted N profiles (Encrypted Profiles 1~N) for the N EIDs to the eUICC manager 603. The bulk profile response message may further include a set of APDUs for each eUICC for processing the encrypted N profiles for the N EIDs.

At step S619, the eUICC manager 603 may deliver an event registration message (Register Event) including the N EIDs (EID1~N), EMID, and event information for each eUICC (Event1~N) to a DC 604. At least one of the eUICC manager 603 and the DC 604 may be operated in an OEM manner.

If an event retrieval request occurs through a plurality of terminals 605 at step S621, each of the plurality of terminals 605 may deliver an event retrieval (Retrieve Event) message including an EID related to its eUICC 606 to the DC 604 at step S623.

At step S625, the DC 604 may deliver an event notification (Notify Event) message including the EMID and corresponding event information (Event 1~N) to each of the plurality of terminals 605.

At step S627, each of the plurality of terminals 605 may transmit an authentication request message to the eUICC manager 603, based on the EMID included in the event notification message.

Thereafter, at step S629, each of the plurality of terminals 605 may perform mutual authentication, profile download and profile installation for each eUICC 606 by interworking with the eUICC manager 603. Thereafter, at steps S631 to S637, each terminal 605 may deliver the result of profile installation to the eUICC manager 603, which may notify this to the profile provider 602, which may notify this to the MNO BSS 601.

Meanwhile, at step S639, if the eUICC manager 603 detects that the event corresponding to each terminal is completely processed based on the result message received from each terminal 605, the eUICC manager 603 may deliver a corresponding event deletion (Delete Event) message to the DC 604, and the DC 604 may delete the registered event information, based on the received event deletion message.

Figure 7:
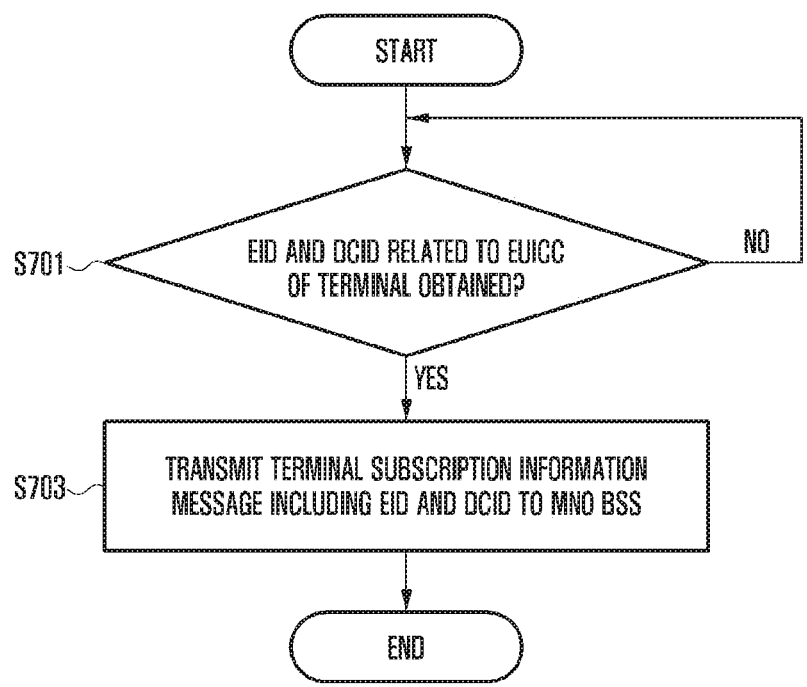
FIG. 7 is a flow diagram illustrating operations of a terminal in a mobile network operator's agency for installing a UICC-related profile in a wireless communication system according to an embodiment of the present invention.

FIG. 7 is a flow diagram illustrating operations of a terminal in a communication company's agency in case of subscribing to a communication service through the agency according to an embodiment of the present invention.

At step S701, the terminal in the agency (i.e., offline store) may obtain EID and DCID information related to the eUICC of the terminal that subscribes to the communication company. For example, the EID and DCID information may be obtained by recognizing a barcode or a QR code displayed on the screen of the terminal. In addition, the EID and DCID information related to the eUICC of the terminal may be obtained by various methods.

At step S703, the terminal that obtains the EID and DCID information may transmit a subscription information message including the obtained information to an MNO BSS. The MNO BSS may deliver the received EID and DCID information to a profile provider so that a profile to be installed on the eUICC corresponding to the EID may be generated.

Figure 8A:
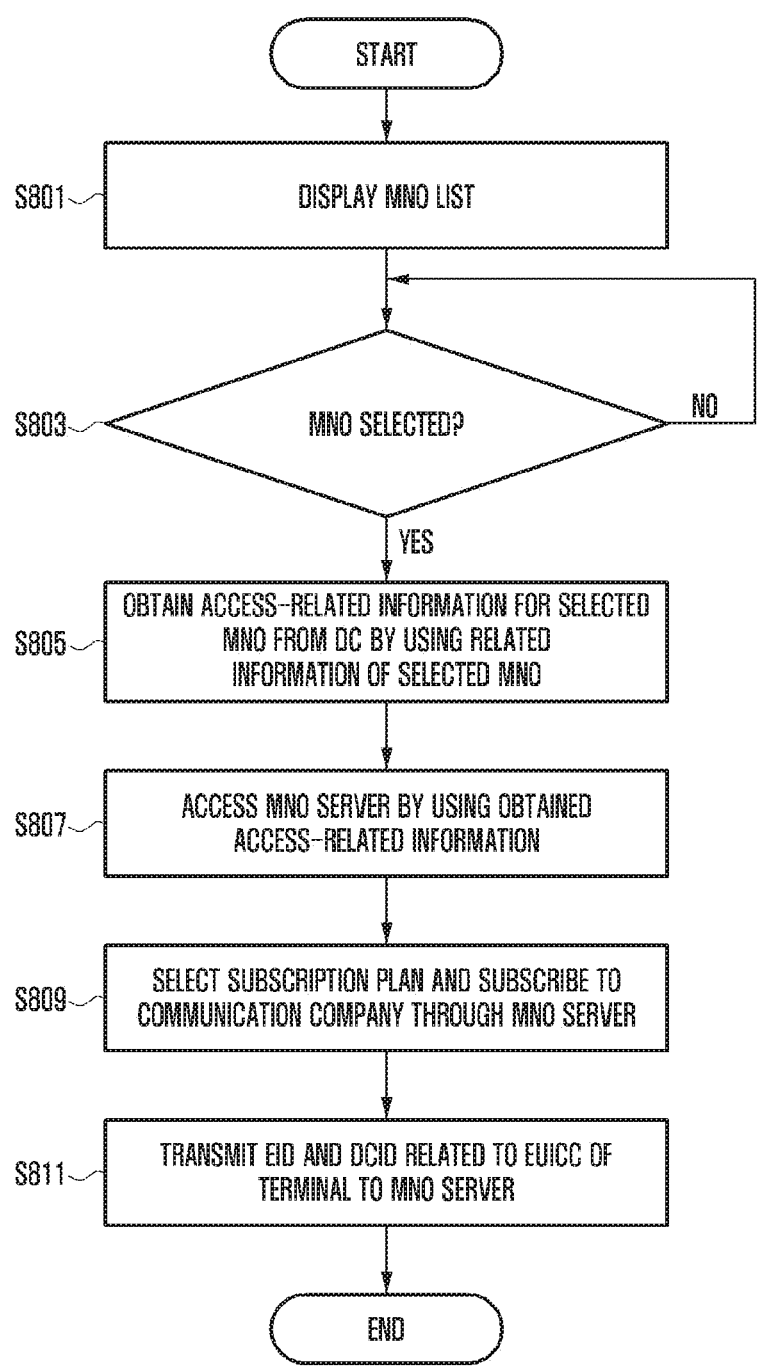
FIG. 8A is a flow diagram illustrating operations of a UICC terminal for installing a UICC-related profile in a wireless communication system according to another embodiment of the present invention.

FIG. 8A is a flow diagram illustrating operations of an eUICC terminal when the eUICC terminal accesses a communication company portal and subscribes to a communication service according to another embodiment of the present invention.

At step S801, the terminal may display a list of user's selectable MNOs through the screen. As discussed above, the MNO list may include at least one of a predetermined MNO list, an MNO list corresponding to a PLMN ID value through RF scanning, an MNO list received from a predetermined server, an MNO list available for each location, and an MNO list based on the capability of the terminal.

At step S803, the terminal may receive an input for selecting one of MNOs from the displayed MNO list. The terminal may detect the input through, for example, a touch input, a key input, a voice input, a motion input, or a command delivered from another apparatus.

At step S805, the terminal may obtain access-related information for the selected MNO from a DC by using related information of the selected MNO. The related information of the MNO may include, for example, an MCC and an MNC or a PLMN ID. The access-related information for the MNO may include access-related information (e.g., URL) for a server of the MNO, e.g., an MNO online portal server.

At step S807, the terminal may access the server of the MNO by using the obtained access-related information for the MNO. For example, the terminal may access the portal of the MNO.

At step S809, the terminal that accesses the MNO server may perform the selection of a subscription plan for the terminal and the subscription to the communication company. For example, the terminal may perform the communication service subscription of the corresponding terminal in the portal site of the MNO.

At step S811, the terminal may transmit the EID and DCID related to the eUICC to the MNO server. The MNO server that obtains the EID and DCID information may transmit a subscription information message including the obtained information to the MNO BSS, and the MNO BSS may deliver the received EID and DCID information to the profile provider so that the profile to be installed on the eUICC corresponding to the EID may be generated.

Figure 8B:
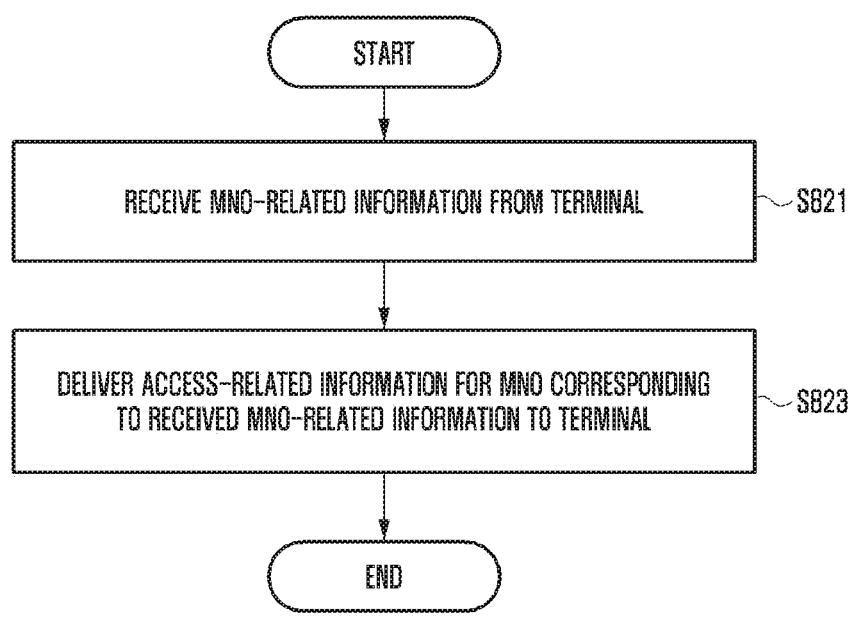
FIG. 8B is a flow diagram illustrating operations of a discovery center for installing a UICC-related profile in a wireless communication system according to another embodiment of the present invention.

FIG. 8B is a flow diagram illustrating operations of a DC when an eUICC terminal accesses online a communication company portal and subscribes to a communication service according to another embodiment of the present invention.

At step S821, the DC may receive MNO-related information from the terminal that desires to install a profile of a communication operator. The MNO-related information may include, for example, an MCC and an MNC or a PLMN ID.

At step S823, the DC may transmit access-related information for the MNO corresponding to the received MNO-related information to the terminal. The access-related information for the MNO may include access-related information (e.g., URL) for a server of the MNO, e.g., an MNO online portal server. The terminal that receives the access-related information for the MNO may access the MNO server by using such information, perform the communication service subscription, and deliver the EID and DCID information related to the eUICC to the MNO server.

Figure 8C:
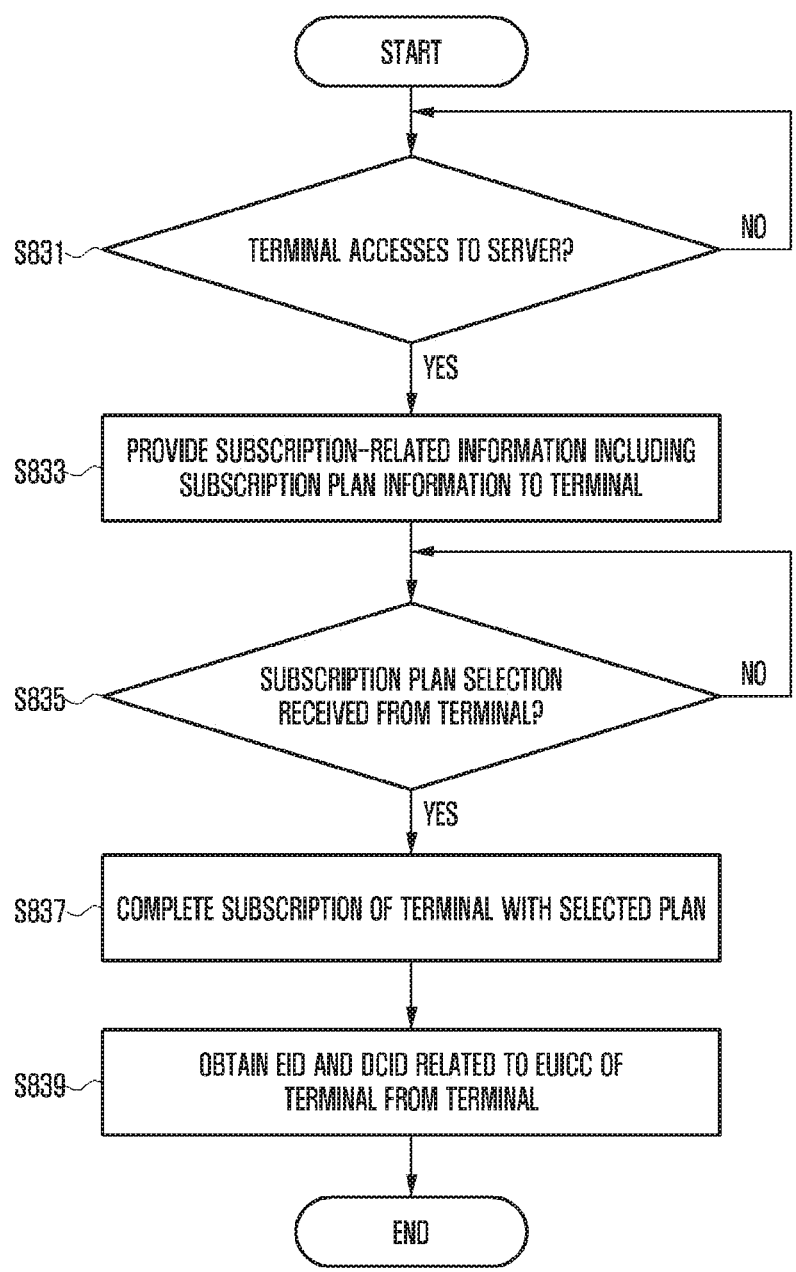
FIG. 8C is a flow diagram illustrating operations of a mobile network operator's server for installing a UICC-related profile in a wireless communication system according to another embodiment of the present invention.

FIG. 8C is a flow diagram illustrating operations of an MNO server when an eUICC terminal accesses online a communication company portal and subscribes to a communication service according to another embodiment of the present invention.

At step S831, the MNO server may determine whether the terminal accesses thereto. For example, the MNO server may include an online portal server of the MNO, and may determine whether the terminal accesses the portal.

At step S833, when the terminal accesses, the MNO server may provide subscription-related information including subscription plan information to the terminal. For example, the related information may be provided to the user in such a manner that the portal screen of the MNO is displayed on the terminal.

The MNO server may receive a selection of the subscription plan from the terminal at step S835, and may complete the subscription of the terminal at step S837, based on the selected plan.

At step S839, the MNO server may obtain EID and DCID related to eUICC of the terminal from the accessed terminal. The MNO server that obtains the EID and DCID information may transmit a subscription information message including the obtained information to an MNO BSS, and the MNO BSS may deliver the received EID and DCID information to a profile provider so that the profile to be installed on the eUICC corresponding to the EID may be generated.

FIG. 9A is a flow diagram illustrating operations of a primary terminal when the primary terminal accesses online a communication company portal and subscribes to a communication service for a secondary terminal according to still another embodiment of the present invention.

At step S901, the primary terminal may obtain access-related information for the selected MNO from the DC by using related information of the subscribed MNO. The related information of the MNO may include, for example, an MCC and an MNC or a PLMN ID. The access-related information for the MNO may include access-related information (e.g., URL) for a server of the MNO, e.g., an MNO online portal server.

At step S903, the primary terminal may obtain EID and DCID related to eUICC of the secondary terminal from the secondary terminal. For example, the primary terminal may receive the EID and the DCID from the secondary terminal through at least one of various wired or wireless connections.

At step S905, the primary terminal may access the server of the MNO by using the obtained access-related information for the MNO. For example, the primary terminal may access the portal of the MNO.

At step S907, the terminal that accesses the MNO server may select a subscription plan for the secondary terminal and subscribe to the communication company. For example, the primary terminal may perform the communication service subscription of the secondary terminal at the portal site of the MNO.

At step S909, the terminal may transmit the obtained EID and DCID related to the eUICC of the secondary terminal to the MNO server. The MNO server that obtains the EID and DCID information may transmit the subscription information message of the secondary terminal including the obtained information to an MNO BSS, and the MNO BSS may deliver the received EID and DCID information to a profile provider so that the profile to be installed on the eUICC corresponding to the EID may be generated.

Figure 9B:
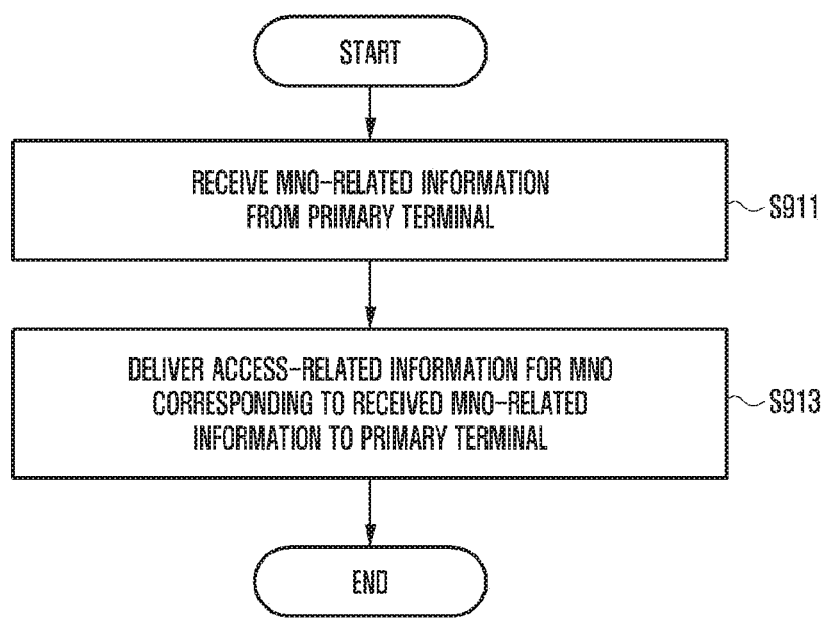
FIG. 9B is a flow diagram illustrating operations of a discovery center for installing a UICC-related profile of a secondary terminal in a wireless communication system according to still another embodiment of the present invention.

FIG. 9B is a flow diagram illustrating operations of a DC when a primary terminal accesses online a communication company portal and subscribes to a communication service for a secondary terminal according to still another embodiment of the present invention.

At step S911, the DC may receive MNO-related information from the primary terminal. The MNO-related information may include, for example, MCC and MNC or PLMN ID of the MNO to which the primary terminal subscribes.

At step S913, the DC may transmit access-related information for the MNO corresponding to the received MNO-related information to the primary terminal. The access-related information for the MNO may include access-related information (e.g., URL) for a server of the MNO, e.g., an MNO online portal server. The primary terminal that receives the access-related information for the MNO may access the server of the MNO by using such information, perform the communication service subscription for the secondary terminal, and deliver the EID and DCID information related to eUICC of the secondary terminal to the MNO server.

Figure 9C:
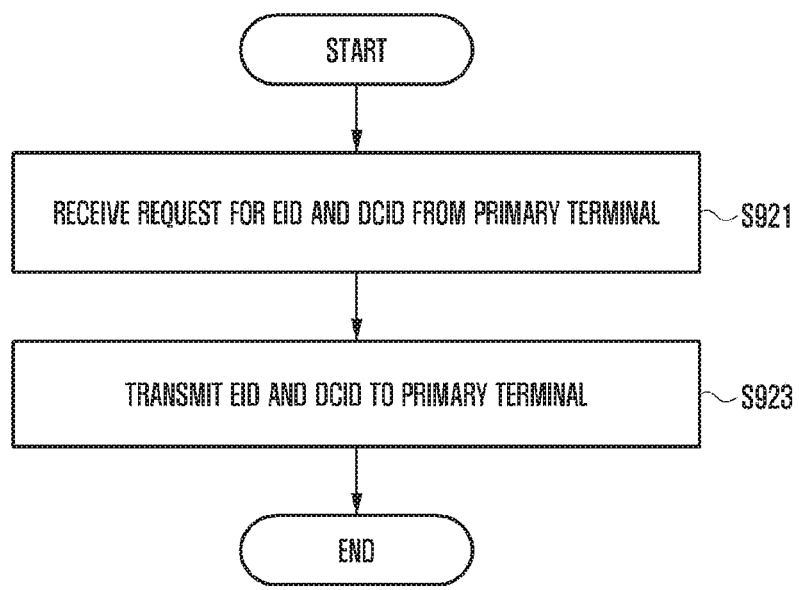
FIG. 9C is a flow diagram illustrating operations of a secondary terminal for installing a UICC-related profile of a secondary terminal in a wireless communication system according to still another embodiment of the present invention.

FIG. 9C is a flow diagram illustrating operations of a secondary terminal when a primary terminal accesses online a communication company portal and subscribes to a communication service for the secondary terminal according to still another embodiment of the present invention.

At step S921, the secondary terminal may receive, from the primary terminal, a request for eUICC-related information (e.g., EID and DCID) for installing a profile on the secondary terminal. For example, the primary and secondary terminals may be connected through at least one of various wired or wireless connections.

At step S923, in response to the request, the secondary terminal may transmit the eUICC-related information including EID and DCID to the primary terminal. Thereafter, the primary terminal may perform the communication company subscription for the secondary terminal and install the profile on the eUICC of the secondary terminal.

Figure 9D:
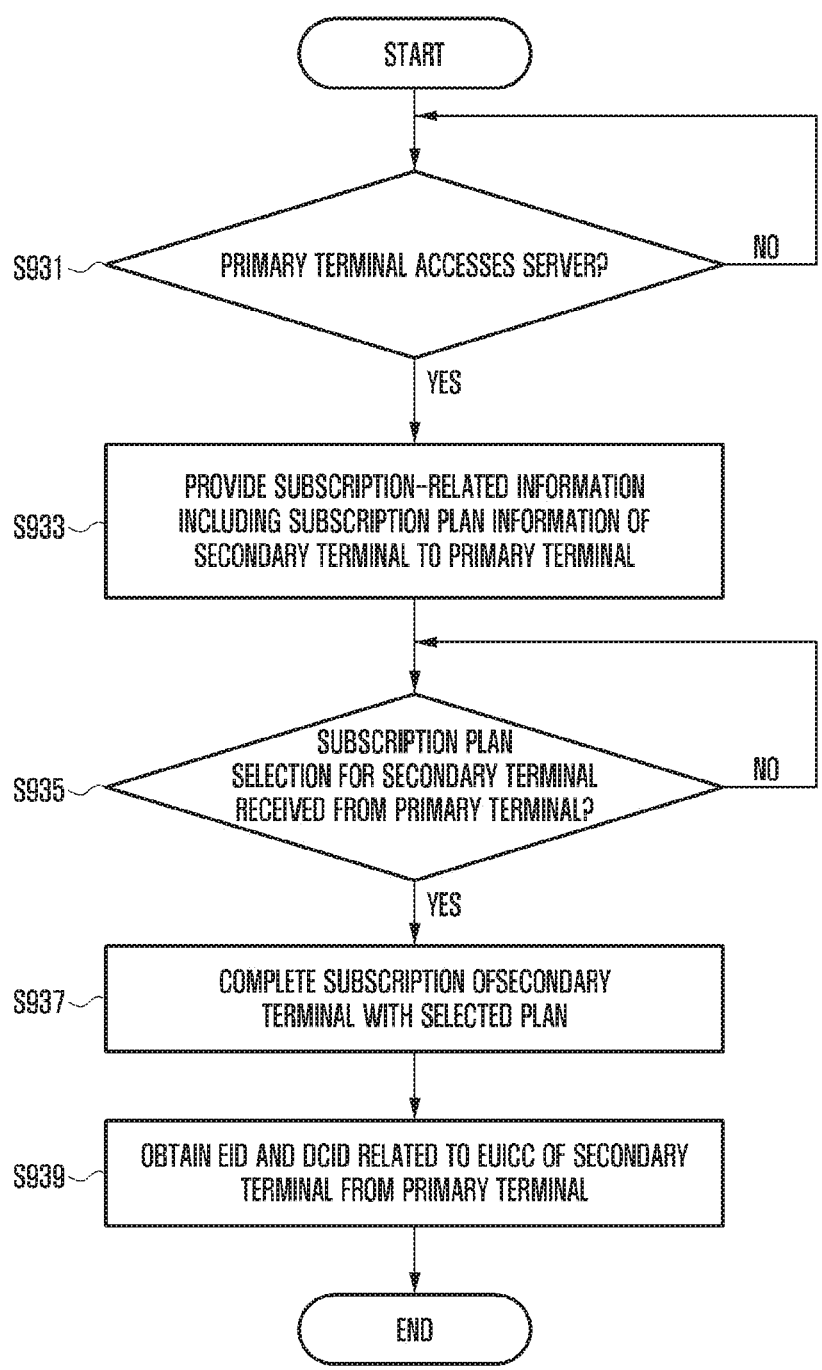
FIG. 9D is a flow diagram illustrating operations of a mobile network operator's server for installing a UICC-related profile of a secondary terminal in a wireless communication system according to still another embodiment of the present invention.

FIG. 9D is a flow diagram illustrating operations of an MNO server when a primary terminal accesses online a communication company portal and subscribes to a communication service for a secondary terminal according to still another embodiment of the present invention.

At step S931, the MNO server may determine whether the primary terminal accesses thereto. For example, the MNO server may include an online portal server of the MNO, and may determine whether the primary terminal accesses the portal.

At step S933, when the primary terminal accesses, the MNO server may provide subscription-related information of the secondary terminal including subscription plan information of the secondary terminal to the primary terminal. For example, the related information may be provided to the user in such a manner that the portal screen of the MNO is displayed on the primary terminal.

The MNO server may receive a selection of the subscription plan for the secondary terminal from the primary terminal at step S935, and may complete the subscription of the secondary terminal at step S937, based on the selected plan.

At step S939, the MNO server may obtain EID and DCID related to eUICC of the secondary terminal from the primary terminal. The MNO server that obtains the EID and DCID information may transmit a subscription information message of the secondary terminal including the obtained information to an MNO BSS, and the MNO BSS may deliver the received EID and DCID information to a profile provider so that the profile to be installed on the eUICC corresponding to the EID may be generated.

Figure 10:
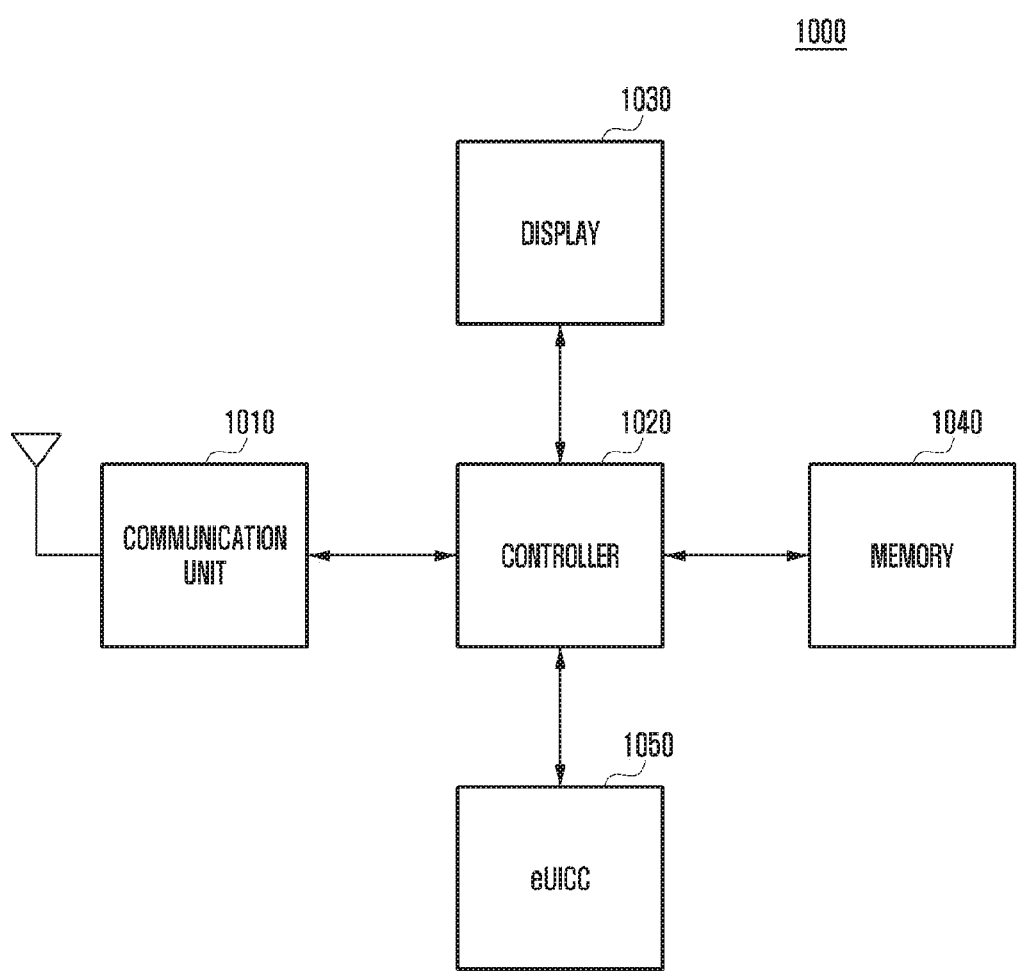
FIG. 10 is a block diagram illustrating the schematic configuration of a terminal according to an embodiment of the present invention.

FIG. 10 is a block diagram illustrating the schematic configuration of a terminal 1000 according to an embodiment of the present invention.

The terminal 1000 may include a communication unit 1010, a controller 1020, a display 1230, a memory 1040, and an eUICC 1050.

The communication unit 1010 may exchange signals with other external devices (e.g., a secondary terminal, a DC, an MNO server, or an eUICC manager) under the control of the controller 1020.

The display 1230 may display a screen under the control of the controller 1020. For example, the display 1230 may display an MNO list or display an MNO portal screen when accessing an MNO online portal server.

The memory 1040 may store various applications including an operating system for operating the terminal 1000. For example, the memory 1040 may store an application for installing a profile in the eUICC 1050.

The eUICC 1050 may download and install the profile of the MNO under the control of the controller 1020. When the profile is installed, it is possible to use a communication service by accessing a mobile communication network of the corresponding communication operator. The eUICC 1050 may be storing EID and DCID.

The controller 1020 may control the display 1230 to display a list including at least one MNO. The controller 1020 may detect the selection of one of the at least one MNO contained in the list. The displayed list may include at least one of an MNO predetermined in the terminal, at least one MNO corresponding to input information, at least one MNO obtained based on location information of the terminal, and at least one MNO obtained based on communication capability of the terminal. The selection of the MNO may be performed by an input via, for example, a touch screen, an input key, a microphone or a motion sensor, or may be performed by a command transmitted from another device.

The controller 1020 may control the communication unit 1010 to obtain access-related information for the selected MNO (e.g., URL information of the MNO online portal server) from the DC, based on related information of the selected MNO (e.g., MCC and MNC, or PLMN ID).

In order to download a related profile from the eUICC manager of the selected MNO, the controller 1020 may transmit the EID and DCID related to the eUICC 1050 to the server of the selected MNO based on the access-related information for the selected MNO. The controller 1020 may access the server of the MNO and perform the selection of a subscription plan and the communication service subscription.

The controller 1020 may control the communication unit 1010 to transmit the EID to the DC and also to receive, from the DC, identification information (e.g., EMID) for the eUICC manager of the selected MNO and event information corresponding to the EID. Also, based on the received EMID and event information, the controller 1020 may download the UICC-related profile from the eUICC manager of the selected MNO and install the UICC-related profile on the eUICC 1050.

Figure 11:
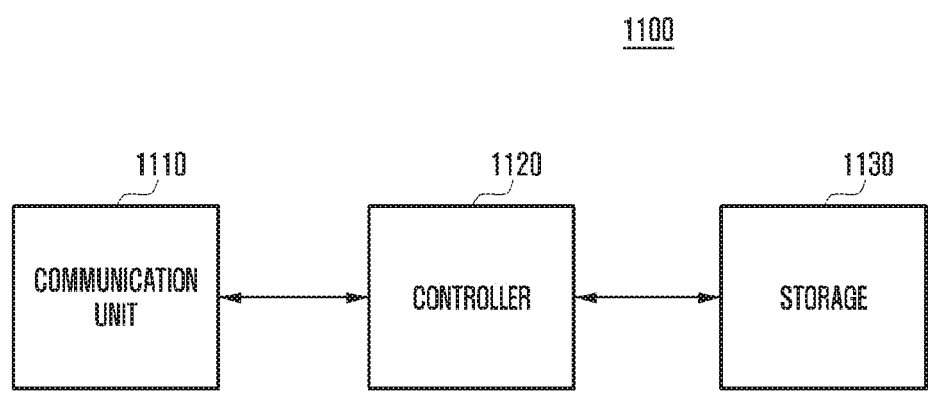
FIG. 11 is a block diagram illustrating the schematic configuration of a discovery center according to an embodiment of the present invention.

FIG. 11 is a block diagram illustrating the schematic configuration of a DC 1100 according to an embodiment of the present invention.

The DC 1100 may include a communication unit 1110, a controller 1120, and a storage 1030.

The communication unit 1010 may exchange signals with other external devices (e.g. a terminal, a DC, an eUICC manager of an MNO) under the control of the controller 1120.

The storage 1130 may store various applications including an operating system for operating the DC 1100. For example, the storage 1130 may store an application for installing a profile on the eUICC. The storage 1130 may store a list including access-related information for the MNO corresponding to MNO-related information.

The controller 1120 may control the communication unit 110 to receive the MNO-related information from the terminal and to transmit the access-related information for the MNO corresponding to the received MNO-related information to the terminal.

The controller 1120 may control the communication unit 110 to receive EID from the terminal and to receive the EID, identification information (e.g., EMID) for an eUICC manager, and event information corresponding to the EID from the eUICC manager. Also, the controller 1120 may control the communication unit 110 to transmit the EMID and the event information corresponding to the EID to the terminal that registers in advance the EID or the terminal that transmits an event retrieval message.

Figure 12:
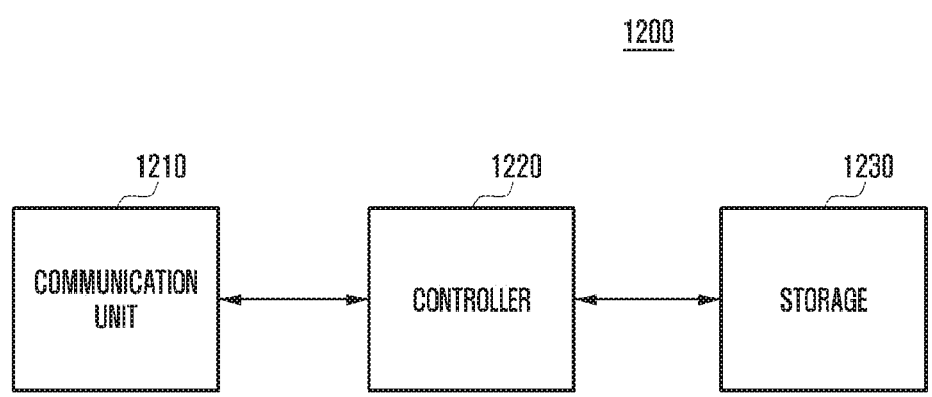
FIG. 12 is a block diagram illustrating the configuration of a mobile network operator's server according to an embodiment of the present invention.

FIG. 12 is a block diagram illustrating the configuration of an MNO server 1200 according to an embodiment of the present invention.

The MNO server 1200 may include a communication unit 1210, a controller 1220, and a storage 1230.

The communication unit 1210 may exchange signals with other external devices (e.g., a terminal, a DC, an MNO BSS) under the control of the controller 1220.

The storage 1230 may store various applications including an operating system for operating the server 1200. The Server 1200 may be, for example, an online portal server of the MNO. For example, the storage 1230 may store an application for online subscription to a communication company by the terminal, and may store an application for installing a profile on an eUICC.

The controller 1220 may control the communication unit 1210 to obtain EID and DCID from an eUICC terminal that accesses the server 1200, and to deliver the obtained EID and DCID to a profile provider through the MNO BSS so that the profile provider can generate a UICC-related profile.

Methods according to claims or embodiments described herein may be implemented in hardware, software, or a combination of hardware and software.

When implemented in software, a computer-readable storage medium that stores one or more programs (software modules) may be provided. The one or more programs stored on the computer-readable storage medium are configured for execution by one or more processors in an electronic device (e.g., terminal or server). The one or more programs include instructions that cause the electronic device to perform the methods according to claims of the present invention or embodiments disclosed herein.

Such programs (software modules, software) may be stored in a memory such as a random access memory, a non-volatile memory including a flash memory, a read only memory (ROM), an electrically erasable programmable ROM (EEPROM), a magnetic disc storage device, a compact disc-ROM (CD-ROM), a digital versatile disc (DVDs), other type optical storage device, a magnetic cassette, or any combination thereof. In addition, each of such memories may be included as plural components.

In addition, the program may be stored in an attachable storage device that is accessible through a communication network such as the Internet, an Intranet, a local area network (LAN), a wide LAN (WLAN), or a storage area network (SAN), or any combination thereof. Such a storage device may access an apparatus that performs an embodiment of the present invention via an external port. Further, a separate storage device on the communication network may access an apparatus that performs an embodiment of the present invention.

In the above-discussed embodiments of the present invention, the elements included in the invention are expressed singular or plural in accordance with the specific embodiment shown. However, it is to be understood that the singular or plural representations are selected appropriately for the sake of convenience of description, and the present invention is not limited to the singular or plural constituent elements. Even expressed as a singular element, it may be composed of plural elements, and vice versa. Although embodiments are described herein individually, two or more of such embodiments may be combined.

Embodiments of the present invention may also be implemented as computer readable codes in a computer readable recording medium. The computer-readable recording medium may be any data storage device capable of storing data that can be read by a computer system. Examples of the computer-readable recording medium include read-only memory (ROM), volatile or nonvolatile memory, CD-ROM, magnetic tapes, floppy disks, optical data storage devices, and carrier waves (such as data transmission over the Internet). Also, functional programs, code, and code segments for accomplishing the present invention may be readily interpreted by those skilled in the art to which the invention applies.

It will be appreciated that the apparatus and method according to embodiments of the present invention described above may be implemented in hardware, software, or a combination of hardware and software. Such arbitrary software may be stored in a memory such as, for example, a volatile or non-volatile storage such as a storage device such as ROM, or a memory such as a RAM, a memory chip, a device, or an integrated circuit, whether erasable or rewritable, or a storage medium readable by a machine (e.g., a computer) as well as being optically or magnetically recordable, such as, for example, a CD, DVD, magnetic disk or magnetic tape. The method according to embodiments of the present invention can be implemented by a network entity such as a computer including a control unit and a memory or a server managed by a communication carrier in various portable terminals or wireless communication systems. It will be appreciated that this is an example of a machine-readable storage medium suitable for storing programs or programs containing instructions for implementing the examples.

Accordingly, embodiments of the present invention include a program including code for implementing the apparatus or method recited in the claims, and a storage medium readable by a machine (such as a computer) for storing the program.

While the present invention has been particularly shown and described with reference to exemplary embodiments thereof, it is clearly understood that the same is by way of illustration and example only and is not to be taken in conjunction with the present invention. It will be understood by those skilled in the art that various changes in form and details may be made therein without departing from the subject matter and scope of the present invention.

What is claimed is:

1. A method performed by a first terminal in a wireless communication system, the method comprising:
   identifying a mobile network operator (MNO) to which the first terminal subscribes;

receiving, from a discovery center (DC), access related information for a MNO server based on information associated with the identified MNO; and transmitting, to the MNO server corresponding to the access related information, first information on at least one subscription plan for a second terminal which is different from the first terminal and includes a universal integrated circuit card (UICC) and second information on a UICC identifier (ID) of the second terminal, wherein a subscription information message is transmitted from the MNO server to a MNO system, the subscription information message including the UICC ID of the second terminal, wherein a profile download message is transmitted from the MNO system to a profile providing server, the profile download message including the UICC ID of the second terminal, and wherein a profile corresponding to the UICC ID is delivered from the profile providing server to the second terminal, the profile being installed in the UICC of the second terminal.

2. The method of claim 1,
wherein the UICC ID of the second terminal is obtained from the second terminal with a discovery center identifier (DCID) of the second terminal, and
wherein the access related information comprises a uniform resource locator (URL) of the MNO server.

3. The method of claim 1,
wherein the at least one subscription plan is detected by an input selecting the at least one subscription plan, and
wherein the first information on the at least one subscription plan comprises a result of the selecting.

4. The method of claim 1, wherein the MNO is selected based on a UICC ID of the first terminal.

5. The method of claim 1, wherein the profile is delivered to the second terminal by an authentication procedure between the UICC of the second terminal, the profile providing server, and a UICC manager.

6. A method performed by a mobile network operator (MNO) server in a wireless communication system, the method comprising:
receiving, from a first terminal, first information on at least one subscription plan for a second terminal which is different from the first terminal and includes a universal integrated circuit card (UICC) and second information on a UICC identifier (ID) of the second terminal, wherein the first information on the at least one subscription plan is received based on access related information for the MNO server; and
delivering, to a profile providing server via a MNO system, a message including the UICC ID of the second terminal,
wherein a profile corresponding to the UICC ID is delivered from the profile providing server to the second terminal, the profile being installed in the UICC of the second terminal,
wherein a MNO to which the first terminal subscribes is identified by the first terminal, and
wherein the access related information is transmitted from a discovery center (DC) to the first terminal based on information associated with the identified MNO.

7. The method of claim 6,
wherein the UICC ID of the second terminal is obtained by the first terminal from the second terminal with a discovery center identifier (DCID) of the second terminal, and wherein the access related information comprises a uniform resource locator (URL) of the MNO server.

8. The method of claim 6,
wherein the at least one subscription plan is detected by an input selecting the at least one subscription plan, and
wherein the first information on the at least one subscription plan comprises a result of the selecting.

9. The method of claim 6, wherein the MNO is identified based on a UICC ID of the first terminal.

10. The method of claim 6, wherein the profile is delivered to the second terminal by an authentication procedure between the UICC of the second terminal, the profile providing server, and a UICC manager.

11. A first terminal in a wireless communication system, the first terminal comprising:
a transceiver configured to transmit and receive a signal; and
a controller configured to:
identify a mobile network operator (MNO) to which the first terminal subscribes,
receive, from a discovery center (DC), access related information for a MNO server based on information associated with the identified MNO, and
transmit, to the MNO server corresponding to the access related information, first information on at least one subscription plan for a second terminal which is different from the first terminal and includes a universal integrated circuit card (UICC) and second information on a UICC identifier (ID) of the second terminal, wherein a subscription information message is transmitted from the MNO server to a MNO system, the subscription information message including the UICC ID of the second terminal, wherein a profile download message is transmitted from the MNO system to a profile providing server, the profile download message including the UICC ID of the second terminal, and wherein a profile corresponding to the UICC ID is delivered from the profile providing server to the second terminal, the profile being installed in the UICC of the second terminal.

12. The first terminal of claim 11,
wherein the UICC ID of the second terminal is obtained from the second terminal with a discovery center identifier (DCID) of the second terminal, and
wherein the access related information comprises a uniform resource locator (URL) of the MNO server.

13. The first terminal of claim 11,
wherein the at least one subscription plan is detected by an input selecting the at least one subscription plan, and
wherein the first information on the at least one subscription plan comprises a result of the selecting.

14. The first terminal of claim 11, wherein the MNO is selected based on a UICC ID of the first terminal.

15. The first terminal of claim 11, wherein the profile is delivered to the second terminal by an authentication procedure between the UICC of the second terminal, the profile providing server, and a UICC manager.

16. A mobile network operator (MNO) server in a wireless communication system, the server comprising:
a transceiver configured to transmit and receive a signal; and
a controller configured to:
receive, from a first terminal, first information on at least one subscription plan for a second terminal which is different from the first terminal and includes a universal integrated circuit card (UICC) and second information on a UICC identifier (ID) of the second terminal, wherein the first information on the at least one subscription plan is received based on access related information for the MNO server, and deliver, to a profile providing server via a MNO system, a message including the UICC ID of the second terminal, wherein a profile corresponding to the UICC ID is delivered from the profile providing server to the second terminal, the profile being installed in the UICC of the second terminal, wherein a MNO to which the first terminal subscribes is identified by the first terminal, and wherein the access related information is transmitted from a discovery center (DC) to the first terminal based on information associated with the identified MNO.

17. The MNO server of claim 16, wherein the UICC ID of the second terminal is obtained by the first terminal from the second terminal with a discovery center identifier (DCID) of the second terminal, and wherein the access related information comprises a uniform resource locator (URL) of the MNO server.

18. The MNO server of claim 16, wherein the at least one subscription plan is detected by an input selecting the at least one subscription plan, and wherein the first information on the at least one subscription plan comprises a result of the selecting.

19. The MNO server of claim 16, wherein the MNO is identified based on a UICC ID of the first terminal.

20. The MNO server of claim 16, wherein the profile is delivered to the second terminal by an authentication procedure between the UICC of the second terminal, the profile providing server, and a UICC manager.

* * * * *